US010808856B2

(12) United States Patent
Shen et al.

(10) Patent No.: US 10,808,856 B2
(45) Date of Patent: Oct. 20, 2020

(54) FLOW CONTROL VALVE

(71) Applicant: HITACHI AUTOMOTIVE SYSTEMS, LTD., Hitachinaka-shi, Ibaraki (JP)

(72) Inventors: Zhenyu Shen, Zama (JP); Shigo Murakami, Ebina (JP); Hideaki Nakamura, Yokohama (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 105 days.

(21) Appl. No.: 15/954,807

(22) Filed: Apr. 17, 2018

(65) Prior Publication Data

US 2018/0313457 A1  Nov. 1, 2018

(30) Foreign Application Priority Data

Apr. 27, 2017 (JP) ................................. 2017-088788

(51) Int. Cl.
| F16K 27/06 | (2006.01) |
| F16K 31/04 | (2006.01) |
| F16K 11/085 | (2006.01) |
| F01P 7/14 | (2006.01) |
| F01P 3/20 | (2006.01) |

(52) U.S. Cl.
CPC .............. *F16K 27/065* (2013.01); *F01P 3/20* (2013.01); *F01P 7/14* (2013.01); *F16K 11/0856* (2013.01); *F16K 31/043* (2013.01); *F01P 2007/146* (2013.01); *F01P 2060/18* (2013.01)

(58) Field of Classification Search
CPC .......... F01P 3/14; F01P 3/20; F01P 2003/608; F01P 7/14; F01P 2007/146; F01P 2060/18; F16K 5/04; F16K 5/0414; F16K 5/0435; F16K 11/0856; F16K 11/205; F16K 11/207; F16K 27/065; F16K 31/043
See application file for complete search history.

(56) References Cited

U.S. PATENT DOCUMENTS

| 5,695,169 | A | * | 12/1997 | Higgins | ................ F16K 5/0414 16/441 |
| 2006/0096644 | A1 | * | 5/2006 | Goldfarb | ................ F16K 11/085 137/625.47 |
| 2016/0281585 | A1 | * | 9/2016 | Muizelaar | ................. F01P 7/14 |

FOREIGN PATENT DOCUMENTS

JP  2002-129956 A  5/2002

* cited by examiner

*Primary Examiner* — Hailey K. Do
(74) *Attorney, Agent, or Firm* — Foley & Lardner LLP

(57) ABSTRACT

Provided is a flow control valve which improves a mounting efficiency. An MCV8 includes a housing including a valve-element housing portion, a first communicating aperture which introduces cooling water, which is flown out of a first water channel formed in an engine, to a valve-element housing portion, and a second communicating aperture which discharges the cooling water in the valve-element housing portion to a second water channel formed in the engine; a rotor accommodated in the valve-element housing portion and configured to change a flow rate of the cooling water discharged to the second water channel, according to a rotation angle of the rotor; and a drive mechanism configured to control the rotation angle of the rotor. The first and second communicating apertures open in an engine-side mounting surface of the housing.

19 Claims, 18 Drawing Sheets

FLOW CONTROL VALVE

TECHNICAL FIELD

The invention relates to flow control valves, namely rate-of-flow control valves.

BACKGROUND ART

Patent Literature 1 discloses a thermostat which is placed in the cooling circuit of an engine and has a first control valve for controlling the flow rate of a coolant that flows through a radiator. The thermostat includes a lower return channel for returning to the engine the coolant which has flown out of the engine at the time of engine start-up.

CITATION LIST

Patent Literature

PTL 1: Unexamined Japanese Patent Application Publication (Kokai) No. 2002-129956

SUMMARY OF INVENTION

Technical Problem

According to the above-mentioned conventional art, a pipe constituting the lower return channel is a separate element from the housing of the first control valve, which requires pipe mounting as well as housing mounting. The conventional art therefore has a problem of a low mounting efficiency.

It is an object of the present invention to provide a flow control valve which improves a mounting efficiency.

Solution to Problem

A flow control valve according to one embodiment of the invention has first and second communicating apertures which open in an engine-side mounting surface of a housing.

Advantageous Effects of Invention

The flow control valve thus configured eliminates the need for pipe arrangement between the engine and the housing, and thus improves a mounting efficiency.

BRIEF DESCRIPTION OF DRAWINGS

Each of FIG. 18A, FIG. 18B, FIG. 18C.

DESCRIPTION OF EMBODIMENTS

Embodiment 1

Figure 1:
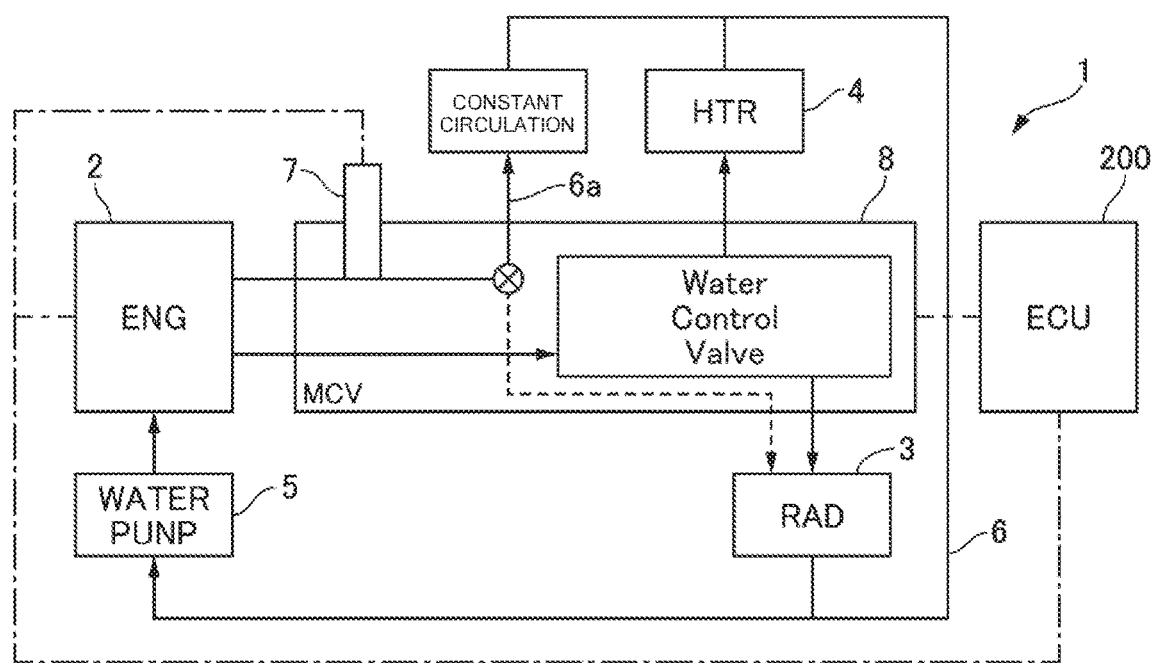
FIG. 1 is a schematic view of a cooling system 1 according to an Embodiment 1.

FIG. 1 is a schematic view of a cooling system 1 according to an Embodiment 1.

The cooling system 1 of the Embodiment 1 includes a circuit 6. The circuit 6 directs cooling water, which has cooled an engine 2, serving as a heat source, to flow through a plurality of heat exchangers (radiator 3 and heater 4) and then returns the cooling water to the engine 2 via a water pump 5. The engine 2 is, for example, a gasoline engine, which is installed in a vehicle. The radiator 3 cools the cooling water through heat exchange between the cooling water and running air. While a vehicle interior is being heated, the heater 4 cools the cooling water through heat exchange between the cooling water and the air blown into the vehicle interior. The water pump 5 is rotationally driven by a driving force of the engine 2 and supplies the cooling water from the radiator 3 and the heater 4 to the engine 2. The circuit 6 includes a normally-open water channel 6a for constantly circulating the cooling water while diverting the cooling water from the heat exchangers 3 and 4. Disposed in the normally-open water channel 6a is a water temperature sensor 7 for detecting the temperature of the cooling water (water temperature). A mechanical control valve (hereinafter, referred to as an MCV) 8 is a flow control valve configured to adjust a flow rate of the cooling water which is supplied from the engine 2 to the heat exchangers 3 and 4. The MCV8 will be explained later in detail. An engine control unit 200 controls a rotation angle of the MCV8 in accordance with the water temperature detected by the water temperature sensor 7, information about the engine 2 (engine vacuum, throttle opening degrees, and other information), etc.

The configuration of the MCV8 will be explained below.

Figure 2:
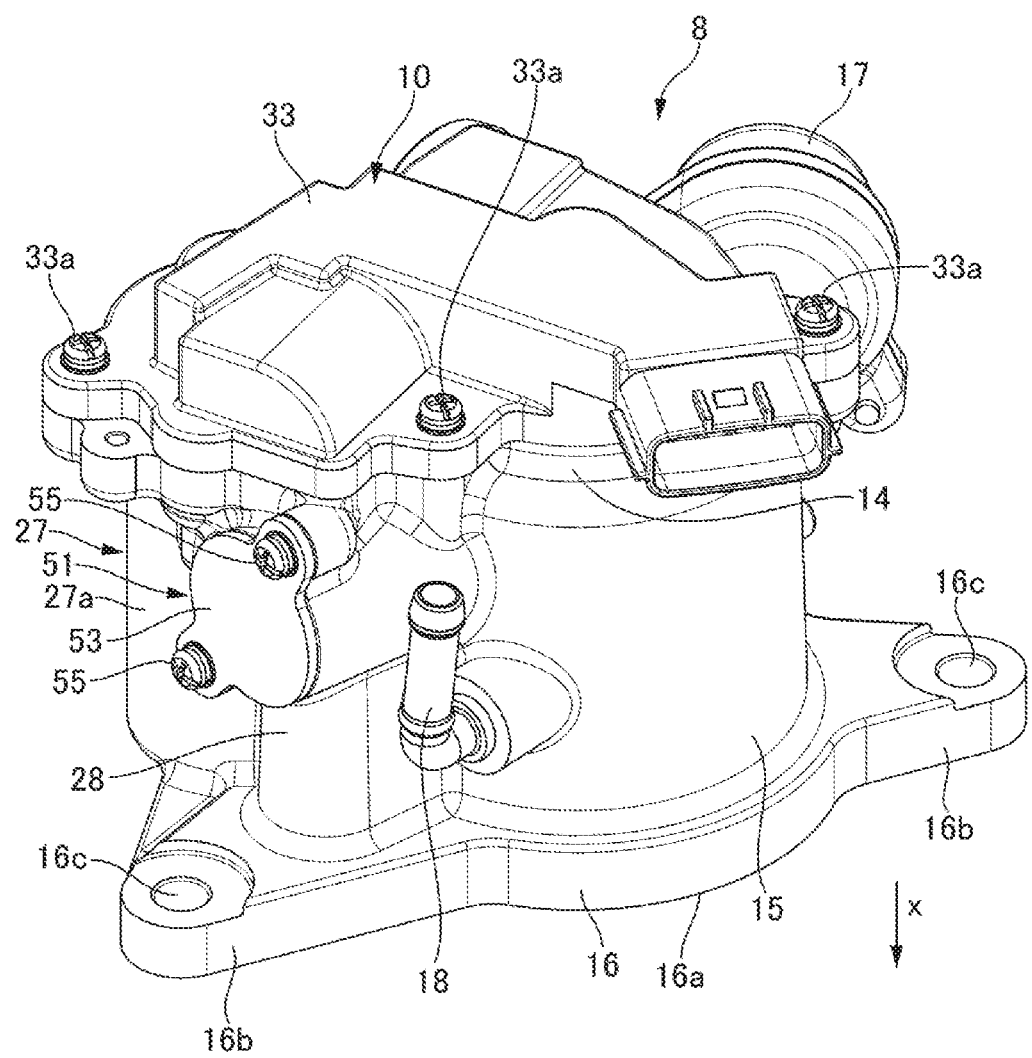
FIG. 2 is a perspective view of an MCV8 according to the Embodiment 1.
Figure 3:
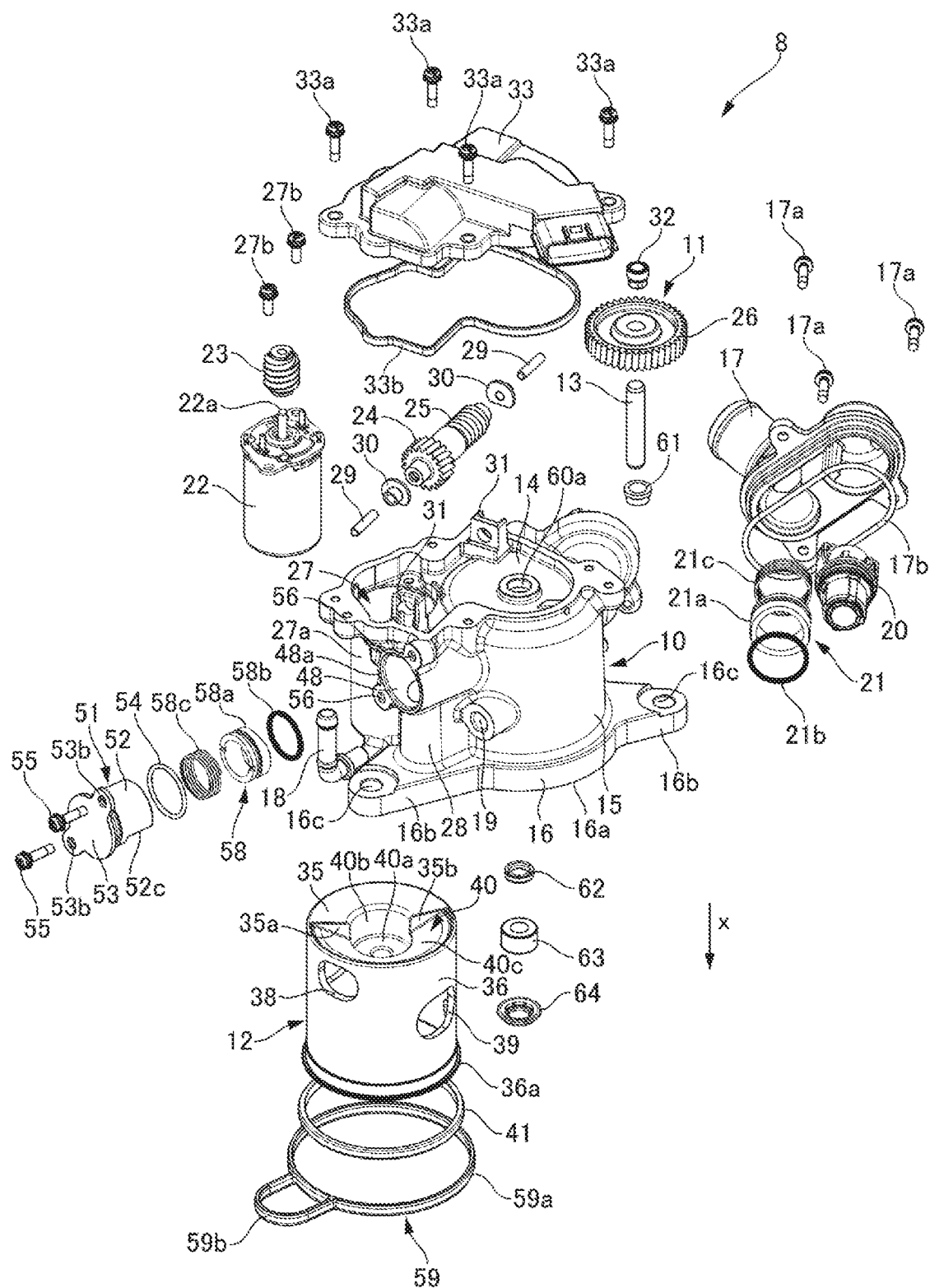
FIG. 3 is an exploded perspective view of the MCV8 according to the Embodiment 1.
Figure 4:
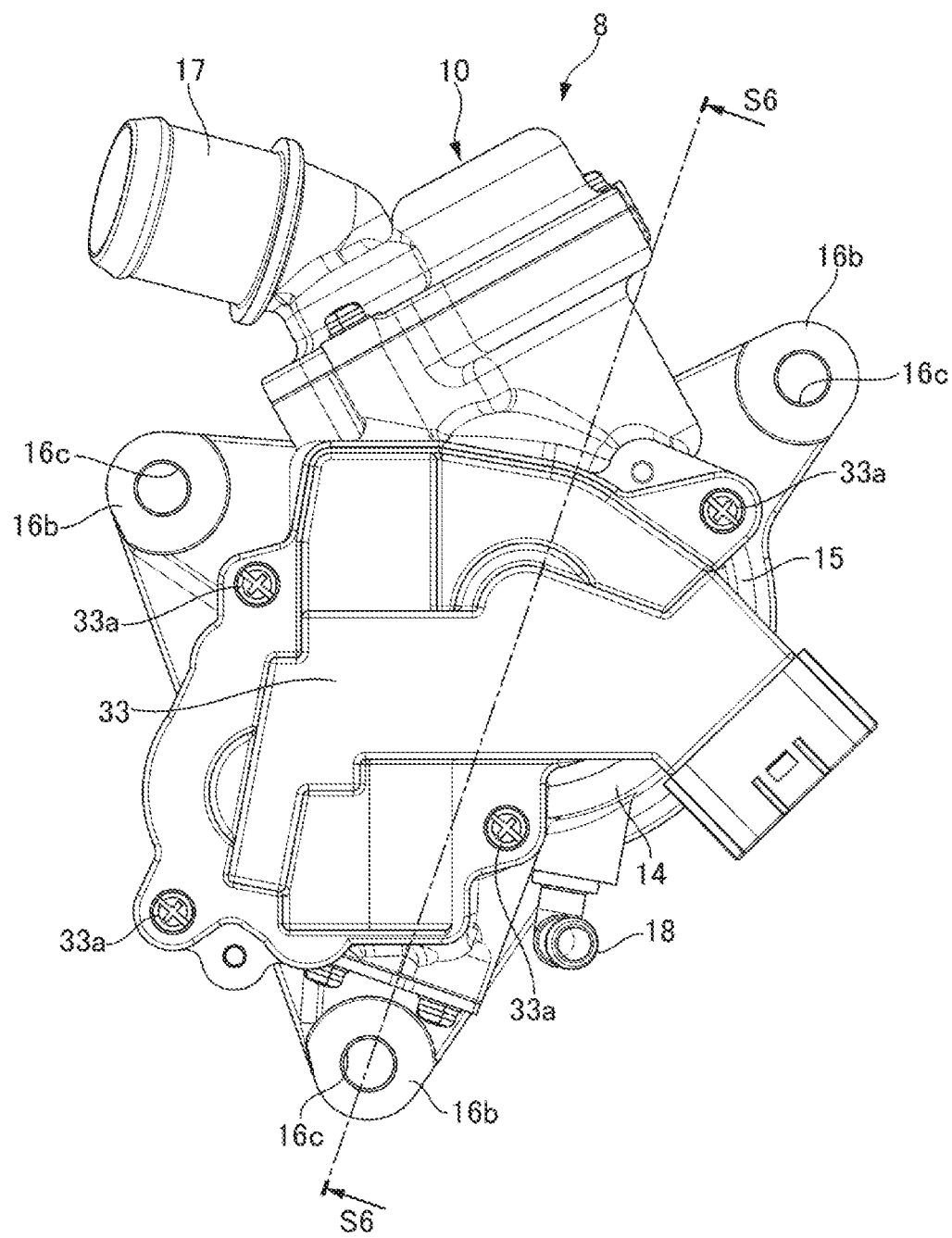
FIG. 4 is a plan view of the MCV8 according to the Embodiment 1.
Figure 5:
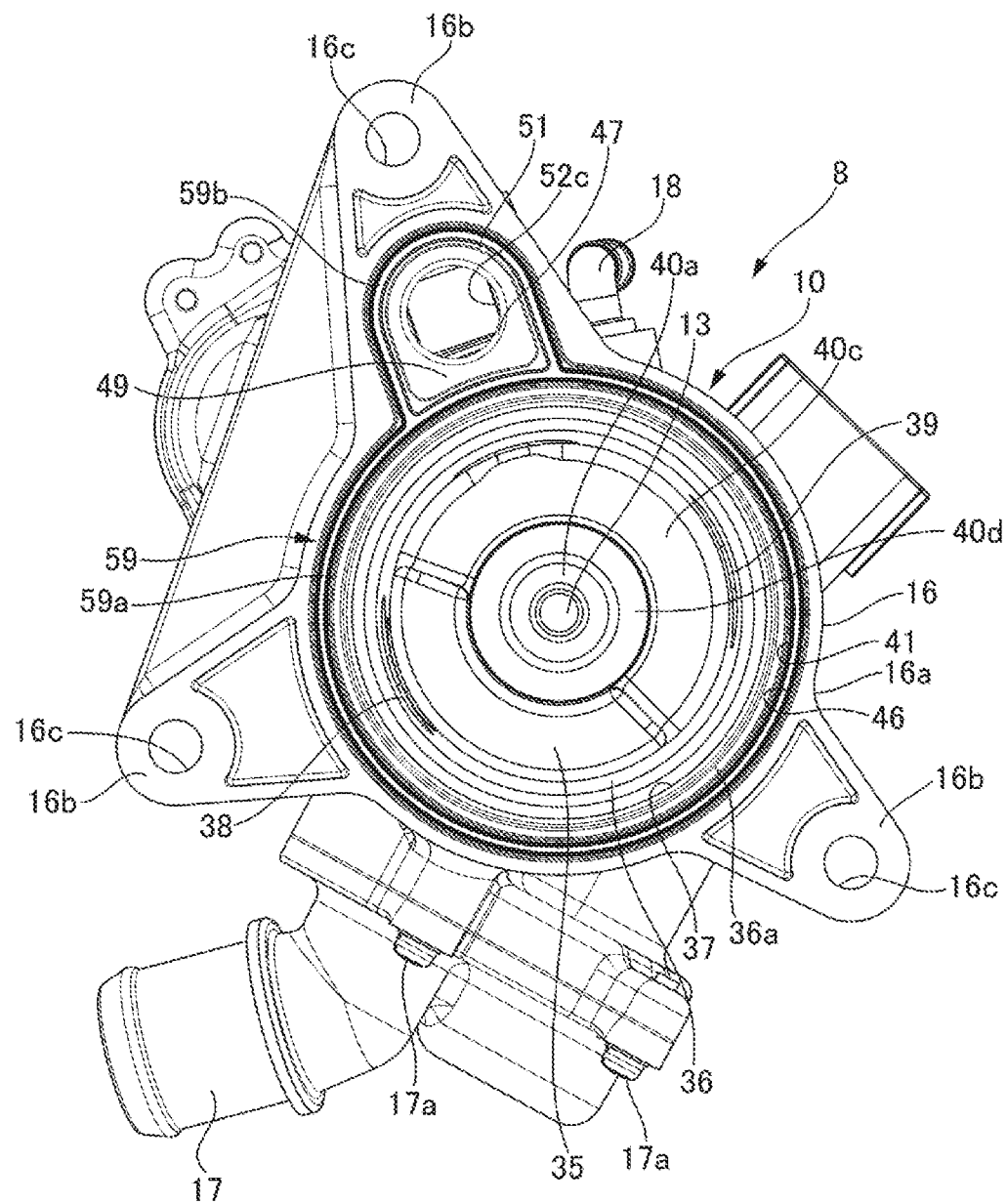
FIG. 5 is a bottom view of the MCV8 according to the Embodiment 1.
Figure 6:
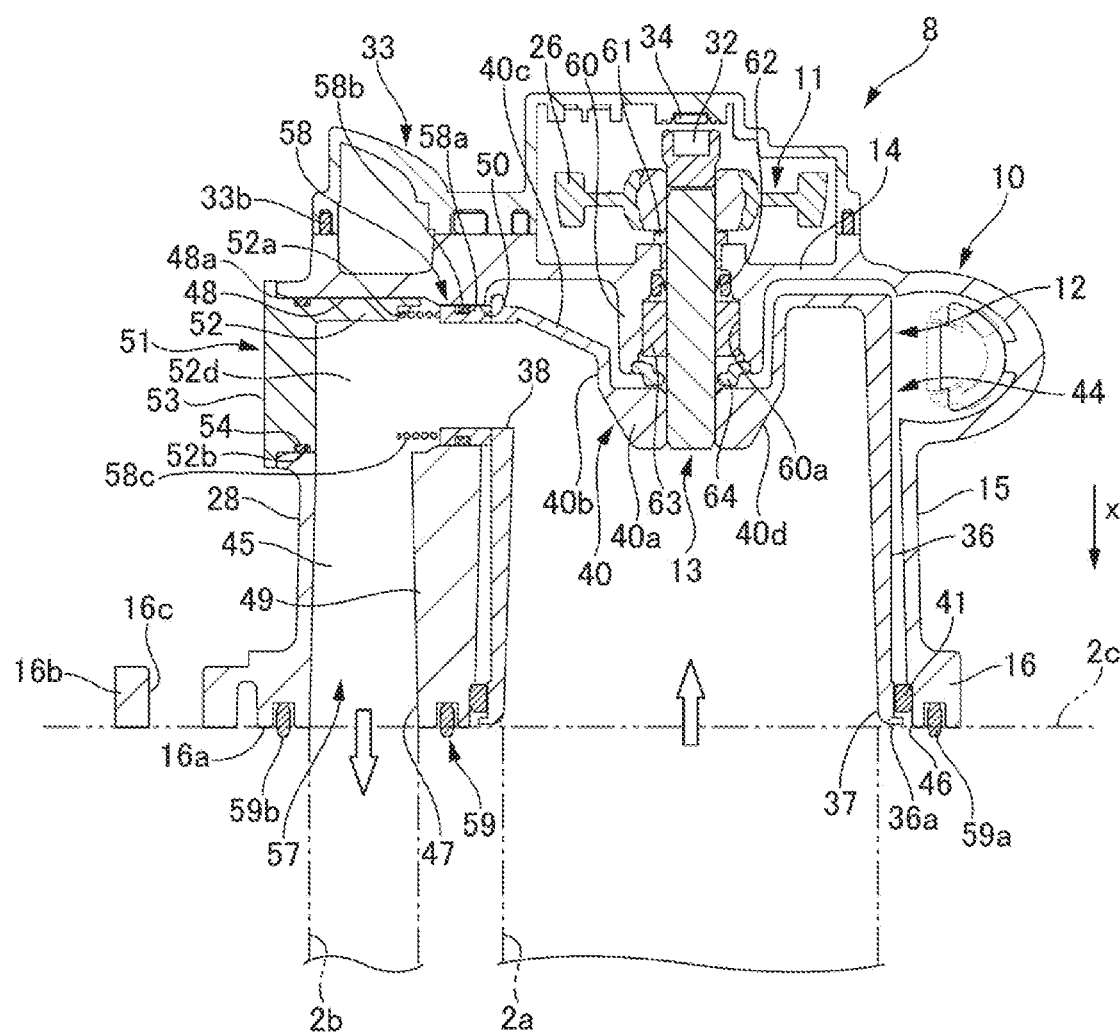
FIG. 6 is an end view along the line S6-S6 of FIG. 4.

FIG. 2 is a perspective view of the MCV8 according to the Embodiment 1. FIG. 3 is an exploded perspective view of the MCV8. FIG. 4 is a plan view of the MCV8. FIG. 5 is a bottom view of the MCV8. FIG. 6 is an end view taken along the line S6-S6 of FIG. 4.

The MCV8 includes a housing 10, a drive mechanism (actuator) 11, a rotor (valve element) 12, and a rotary shaft 13. The following description is based on the assumption that there is an x-axis extending along a rotation axis of the rotary shaft 13. Hereinafter, a direction from the drive mechanism 11 toward the rotor 12 along the x-axis is referred to as an x-axis positive direction, and the other direction as an x-axis negative direction. A radiation direction of the x-axis is referred to as a radial direction, and a direction around the x-axis as a circumferential direction.

The housing 10 is formed, for example, by mold injection using a synthetic resin material. The housing 10 includes a base 14 and a peripheral wall 15. The base 14 has a substantially disc-like shape extending in a direction orthogonal to the x-axis. The rotary shaft 13 extends through a center of the base 14. The peripheral wall 15 has a substantially cylindrical shape extending from an outer periphery of the base 14 in the x-axis positive direction. The peripheral wall 15 is tapered to gradually increase in inner diameter from the x-axis negative direction side to the x-axis positive direction side. The housing 10 accommodates the rotor 12 so as to allow the rotor 12 to rotate in the circumferential direction. The housing 10 has an x-axis positive direction end which is provided with a mounting portion 16. The mounting portion 16 has an x-axis positive direction end which is provided with an engine-side mounting surface 16a. The engine-side mounting surface 16a is a flat surface extending in a direction orthogonal to the x-axis. The mounting portion 16 includes three mounting bosses 16b protruding in a radially outward direction. A screw insertion hole 16c extends through each of the mounting bosses 16b in the x-axis direction. The housing 10 is mounted on an MCV mounting surface 2c of the engine 2 by screws, not shown, inserted in the screw insertion holes 16c. The MCV mounting surface 2c is a flat surface.

A first outlet (radiator water conduit) 17 and a second outlet 18, serving as pipe connectors, protrude from the peripheral wall 15 of the housing 10 in the radially outward direction. The first outlet 17 connects a third communicating aperture, not shown, formed in the peripheral wall 15 to a water channel extending toward the radiator 3. When the rotor 12 is positioned within a predetermined rotation angle range, the third communicating aperture radially overlaps (coincides with) a third opening 39 formed in the rotor 12. An overlapping amount varies with the rotation angle. The third communicating aperture is provided with a seal member 21. The seal member 21 includes a rotor seal 21a, an O-ring 21b, and a coil spring 21c. The second outlet 18 connects a fourth communicating aperture 19 formed in the peripheral wall 15 to the normally-open water channel 6a. A fifth communicating aperture, not shown, is formed in the peripheral wall 15. The fifth communicating aperture is in communication with the fourth communicating aperture 19. Formed in the first outlet 17 is a water channel, not shown, which connects the fifth and third communicating apertures to each other. A thermostat 20 is disposed within this water channel. The thermostat 20 has a fail-safe function which opens the water channel to accelerate the reduction of water temperature when the water temperature is raised too much (for example, to 100° C. or higher). The first outlet 17 is fastened to the peripheral wall 15 with three screws 17a. A seal ring 17b for preventing a liquid leakage is interposed between the first outlet 17 and the peripheral wall 15. The configuration of the housing 10 will be explained later in detail.

The drive mechanism 11 is located on the x-axis negative direction side of the base 14 and rotationally drives the rotary shaft 13 to control the rotation angle of the rotor 12. The drive mechanism 11 includes an electric motor 22, a motor worm 23, an intermediate gear 24, an intermediate worm 25, and a rotor gear 26. The electric motor 22 is controlled by the engine control unit 200. The electric motor 22 is accommodated in a motor housing portion (actuator housing portion) 27, which is formed in the peripheral wall 15 of the housing 10, with an output shaft 22a directed in the x-axis negative direction. The electric motor 22 is secured within the motor housing portion 27 by two screws 27b. The motor housing portion 27 has an outer wall 27a which is connected to a reinforcing rib 28. The reinforcing rib 28 extends in the x-axis direction from an x-axis negative direction end of the mounting bosses 16b to an x-axis negative direction end of the peripheral wall 15. The reinforcing rib 28 improves the strength of the motor housing portion 27. The motor worm 23 rotates integrally with the output shaft 22a.

The intermediate gear 24 is engaged with the motor worm 23. The intermediate worm 25 is formed integrally with the intermediate gear 24. Shafts 29 are press-fitted in both ends of the intermediate gear 24 and the intermediate worm 25. The shafts 29 are rotatably supported by brackets 31 with bearings 30 intervening therebetween. The brackets 31 protrude from the base 14 in the x-axis negative direction. The rotor gear 26 is fixed to an x-axis negative direction end of the rotary shaft 13 and rotates integrally with the rotary shaft 13. Attached to the x-axis negative direction end of the rotary shaft 13 is a magnet 32. The motor worm 23, the intermediate gear 24, the intermediate worm 25, and the rotor gear 26 are accommodated in a gear housing 33. The gear housing 33 includes an MR sensor 34. The MR sensor 34 detects a rotation angle of the rotary shaft 13, or the rotation angle of the rotor 12, on the basis of a magnetic field change along with the rotation of the rotary shaft 13. The rotation angle detected by the MR sensor 34 is transmitted to the engine control unit 200. The gear housing 33 is fastened to the base 14 with four screws 33a. A seal ring 33b is interposed between the base 14 and the gear housing 33.

The rotor 12 is formed, for example, by mold injection using a synthetic resin material. The rotor 12 includes a bottom 35, an outer peripheral portion 36, a first opening 37, a second opening 38, a third opening 39, and an extending portion (support portion) 40. The bottom 35 is located in an x-axis negative direction end of the rotor 12 and positioned perpendicular to the x-axis direction. The bottom 35 has a shape like a donut whose 180 or slightly greater degree-angled segment, except its outer peripheral portion, is cut away, as viewed from the x-axis negative direction side. The outer peripheral portion 36 has a substantially cylindrical shape, which extends from an outer periphery of the bottom 35 toward the x-axis positive direction side. The outer peripheral portion 36 is tapered to gradually increase in inner diameter from the x-axis negative direction side toward the x-axis positive direction side. The outer peripheral portion 36 has a flange portion 36a extending radially outward from an x-axis positive direction end of the outer peripheral portion 36. A slide bearing 41 is disposed on the x-axis negative direction side of the flange portion 36a in the vicinity of an x-axis positive direction end of the peripheral wall 15. The slide bearing 41 supports the rotor 12 in such a way that the rotor 12 is rotatable with respect to the housing 10. The slide bearing 41 receives a radial force from the rotor 12. The first opening 37 is a circular opening formed in an x-axis positive direction end of the outer peripheral portion 36 (x-axis positive direction end of the rotor 12). The second opening 38 and the third opening 39 are formed in the outer peripheral portion 36. The second opening 38 is located on the x-axis negative direction side of the third opening 39.

The extending portion 40 extends from the outer periphery of the bottom 35 in the x-axis positive direction to be coupled with an x-axis positive direction end of the rotary shaft 13. The extending portion 40 includes a distal end 40a, a cylindrical portion 40b, and a guide portion 40c. The distal end 40a is located in an x-axis positive direction end of the extending portion 40. The distal end 40a is fixed to the rotary shaft 13. The distal end 40a has an outer periphery provided with a guide surface 40d. The guide surface 40d is tapered to gradually increase in radial dimension from the x-axis positive direction side toward the x-axis negative direction side. The cylindrical portion 40b is formed into a cylinder which extends from the guide surface 40d in the x-axis negative direction. The cylindrical portion 40b has an x-axis negative direction end which is circumferentially connected to the guide portion 40c within the cut-away region of the bottom 35, and connected to the bottom 35 within the other region. The guide portion 40c is circumferentially defined within the cut-away region of the bottom 35 and connects the cylindrical portion 40b to the outer periphery of the bottom 35. The guide portion 40c is tapered to gradually expand in radial outer shape from the x-axis positive direction side toward the x-axis negative direction side. The guide portion 40c and the guide surface 40d overlap the second opening 38 in the x-axis direction. The guide portion 40c is connected to an opening edge of the second opening 38. The bottom 35 includes two connecting portions 35a and 35b connected to the guide portion 40c. The connecting portions 35a and 35b both extend in the x-axis direction. When the rotor 12 is positioned at a predetermined rotation angle, the connecting portions 35a and 35b are both circumferentially engaged with a stopper, not shown, which is formed in the base 14. The rotor 12 is rotatable within an angle range of slightly smaller than 180 degrees, where the rotor 12 rotates clockwise as viewed from the x-axis negative direction side, from a position in which the connecting portion 35a is in contact with the stopper to a position in which the connecting portion 35b comes into contact with the stopper.

The configuration of the housing 10 will be now explained in detail with reference chiefly to FIG. 6.

The housing 10 includes a valve-element housing portion 44, a water conduit 45, a first communicating aperture 46, a second communicating aperture 47, and a connecting path 48.

The valve-element housing portion 44 is a substantially column-like space formed within the housing 10 and extends in the x-axis direction. The valve-element housing portion 44 is tapered to gradually increase in inner diameter from the x-axis negative direction side toward the x-axis positive direction side. The valve-element housing portion 44 accommodates the rotor 12 so as to allow the rotor 12 to rotate in the circumferential direction. The third communicating aperture, the fourth communicating aperture 19, and the fifth communicating aperture, which are formed in the peripheral wall 15, open in the valve-element housing portion 44.

The water conduit 45 is a space formed within the reinforcing rib 28 and extends in the x-axis direction. The water conduit 45 and the valve-element housing portion 44 are separated from each other by a partition wall 49. The water conduit 45 is tapered to gradually increase in inner diameter from the x-axis negative direction side toward the x-axis positive direction side. The water conduit 45 is smaller in sectional area than the valve-element housing portion 44. The partition wall 49 extends from the x-axis positive direction end of the housing 10 toward an x-axis negative direction of the housing 10 to be connected to the base 14.

The first communicating aperture 46 is an opening which opens in the engine-side mounting surface 16a. The first communicating aperture 46 is in communication with the valve-element housing portion 44. The first communicating aperture 46 is an introduction port configured to introduce the cooling water, which has flown out of a first water channel 2a, to the valve-element housing portion 44. The first water channel 2a is formed in the engine 2. The cooling water which cooled the engine 2 is discharged to the first water channel 2a.

The second communicating aperture 47 is an opening which opens in the engine-side mounting surface 16a of the mounting bosses 16b. The second communicating aperture 47 is in communication with the water conduit 45. The second communicating aperture 47 is a discharge port configured to discharge the cooling water in the water conduit 45 to a second water conduit 2b of the engine 2. The second water conduit 2b is a water channel formed in the engine 2 and leads toward the heater 4. The second communicating aperture 47 is smaller in opening area than the first communicating aperture 46.

Figure 7A:
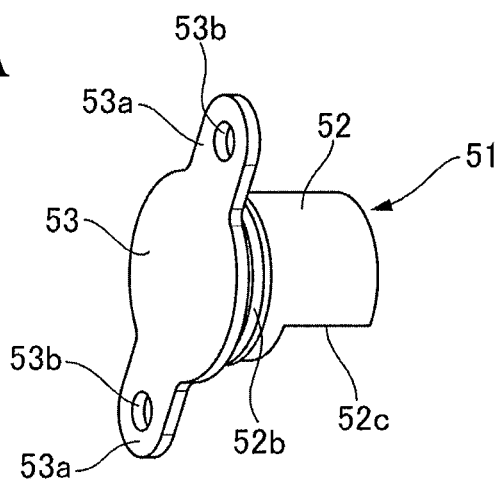
FIG. 7A is a perspective view of a cap 51 according to the Embodiment 1.
Figure 7B:
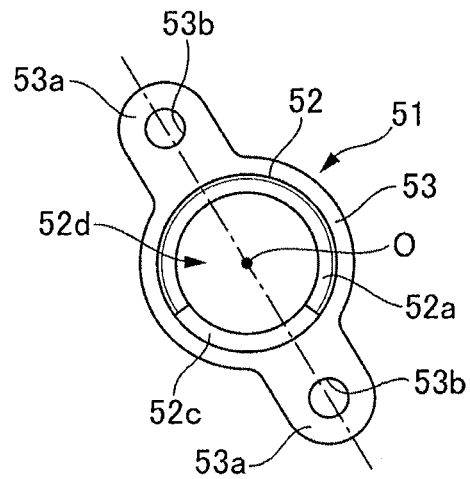
FIG. 7B is an elevation view of the cap 51.

The connecting path 48 is located on the x-axis negative direction side of the water conduit 45 within the reinforcing rib 28. The connecting path 48 is a substantially column-like space which extends radially outward from the partition wall 49. The connecting path 48 extends to the outside of the reinforcing rib 28. The partition wall 49 is provided with an internal communicating aperture 50 which connects the connecting path 48 and the valve-element housing portion 44 to each other. The internal communicating aperture 50 overlaps the second opening 38 in the x-axis direction. When the rotor 12 is positioned within a predetermined rotation angle range, the internal communicating aperture 50 radially overlaps the second opening 38 formed in the rotor 12. An overlapping amount varies with the rotation angle of the rotor 12. The connecting path 48 is closed with a cap 51. The cap 51 is formed, for example, by mold injection using a synthetic resin material. The cap 51 is inserted into the connecting path 48 from an opening 48a of the connecting path 48 formed in the reinforcing rib 28. FIG. 7A is a perspective view of the cap 51, and FIG. 7B is an elevation view of the cap 51. The cap 51 includes a cylindrical portion 52 and a flange portion 53.

The cylindrical portion 52 has such an outer diameter that the cylindrical portion 52 can be inserted into the connecting path 48, and such an axial length that the cylindrical portion 52 reaches the internal communicating aperture 50. The cylindrical portion 52 includes a stepped portion 52a in an inner peripheral side of a distal end portion thereof. The stepped portion 52a is located closer to the proximal end side (flange portion 53 side) than to an outer peripheral side of the distal end portion of the cylindrical portion 52. An annular groove 52b is formed close to a proximal end of the cylindrical portion 52. An O-ring 54 is fitted in the annular groove 52b. The O-ring 54 seals a gap between an inner peripheral surface of the connecting path 48 and an outer peripheral surface of the cylindrical portion 52. A substantially rectangular cut-away portion 52c is formed in a water conduit 45 side (x-axis positive direction side) of the cylindrical portion 52. The cut-away portion 52c extends from the distal end side to the proximal end side of the cylindrical portion 52. The cut-away portion 52c is substantially equal in opening area to the water conduit 45. An internal space of the cylindrical portion 52 and the cut-away portion 52c of the cylindrical portion 52 serve as a communicating path 52d connecting the water conduit 45 and the internal communicating aperture 50 to each other. The communicating path 52d, the water conduit 45, and the internal communicating aperture 50 constitutes an internal passage 57 which connects the second communicating aperture 47 and the internal communicating aperture 50 to each other.

The flange portion 53 is formed integrally with the cylindrical portion 52 in the proximal end side of the cylindrical portion 52. The flange portion 53 has a disc-like shape. The flange portion 53 is larger in outer diameter than the opening 48a of the connecting path 48. The flange portion 53 includes a pair of mounting bosses 53a, 53a. The mounting bosses 53a are each provided with a screw insertion hole 53b in which a screw (fixing member) 55 is inserted. The reinforcing rib 28 is provided with a pair of threaded holes 56, 56 corresponding to the pair of screw insertion holes 53b, 53b. After being inserted in the connecting path 48, the cap 51 is fastened to the reinforcing rib 28 with a pair of screws 55, 55. The flange portion 53, as viewed from an axial direction of the cylindrical portion 52, is point-symmetric, or double-symmetric, with a point on a central axis line 0 being a symmetric point.

A seal member 58 is attached to the internal communicating aperture 50. The seal member 58 prevents the cooling water from leaking from the second opening 38 or the internal communicating aperture 50 into a gap between the valve-element housing portion 44 and the rotor 12. The seal member 58 includes a rotor seal 58a, an O-ring 58b, and a coil spring 58c. The rotor seal 58a has a cylindrical shape and is inserted in the internal communicating aperture 50. The rotor seal 58a is displaceable with respect to the internal communicating aperture 50. The rotor seal 58a has a distal end in contact with the outer peripheral portion 36. The O-ring 58b seals a gap between an inner peripheral surface of the internal communicating aperture 50 and an outer peripheral surface of the rotor seal 58a. The coil spring 58c is disposed, in a compressed position, between the stepped portion 52a of the cap 51 and the rotor seal 58a. The coil spring 58c thus biases the rotor seal 58a toward the outer peripheral portion 36 side.

A seal member 59 is attached to the engine-side mounting surface 16a of the housing 10. The seal member 59 seals a gap between the engine-side mounting surface 16a and the MCV mounting surface 2c. The seal member 59 has a first sealing portion 59a and a second sealing portion 59b. The first sealing portion 59a has an annular shape which encircles a peripheral edge of the first communicating aperture 46. The second sealing portion 59b encircles the second communicating aperture 47 in consort with a part of the first sealing portion 59a. The three mounting bosses 16b are arranged radially outside the seal member 59 around the first and second communicating apertures 46 and 47.

The housing 10 includes a bearing 60. The bearing 60 supports the rotary shaft 13 in such a way that the rotary shaft 13 is rotatable with respect to the housing 10. The bearing 60 has a substantially cylindrical shape extending in the x-axis direction. The bearing 60 protrudes from a central part of the base 14 in the x-axis positive direction. In a center part of the bearing 60, there is formed a through-hole 60a through which the rotary shaft 13 extends. The bearing 60 includes a radial thrust bearing 61, a dust seal 62, a liquid-tight seal 63, and a thrust bearing 64 in the through-hole 60a. The radial thrust bearing 61 is located in an x-axis negative direction end of the bearing 60. The radial thrust bearing 61 receives radial and x-axial forces from the rotary shaft 13. The dust seal 62 is located between the radial thrust bearing 61 and the liquid-tight seal 63 in the x-axis direction. The dust seal 62 prevents the cooling water, which has flown into the bearing 60, from entering the drive mechanism 11. The liquid-tight seal 63 is located between the dust seal 62 and the radial thrust bearing 61 in the x-axis direction. The liquid-tight seal 63 prevents the cooling water from flowing out of the valve-element housing portion 44. The thrust bearing 64 is located in an x-axis positive direction end of the bearing 60 and receives the x-axial force from the rotary shaft 13.

The following description explains operation and advantageous effects of the MCV8 of the Embodiment 1.

In the cooling system 1 of the Embodiment 1, the first and second water channels 2a and 2b formed in the engine 2 open in the MCV mounting surface 2c of the engine 2. According to conventional flow control valves, a discharge port for returning cooling water to the engine opens in a different surface from the engine-side mounting surface of a housing. This requires not only housing mounting but also pipe mounting between the flow control valve and the engine. The conventional art therefore has a problem of a low mounting efficiency.

As contrasted to the conventional flow control valves, the MCV8 of the Embodiment 1 is so configured that the first communicating aperture 46 and the second communicating aperture 47 both open in the engine-side mounting surface 16a to be connected directly to the first and second water channels 2a and 2b. The first communicating aperture 46 serves as an introduction port configured to introduce the cooling water, which has flown out of the first water channel 2a, to the valve-element housing portion 44. The second communicating aperture 47 serves as a discharge port configured to discharge to the second water channel 2b the cooling water which has flown out of the valve-element housing portion 44 to the internal passage 57. In short, the MCV8 includes a portless structure between the MCV8 and the engine 2. This portless structure makes it possible to complete the pipe mounting between the MCV8 and the engine 2 simply by mounting the housing 10 on the engine 2. Since the pipe mounting between the MCV8 and the engine 2 can be omitted, the mounting efficiency of the MCV8 is improved. The portless structure further eliminates the need for an outlet (pipe joint) for the second communicating aperture 47 and therefore simplifies the structure.

The engine control unit 200 controls the rotation angle of the rotor 12 and thus adjusts the overlapping (overlapping amount) of the internal communicating aperture 50 and the second opening 38. It is then possible to arbitrarily control the flow rate of a portion of the cooling water introduced from the first communicating aperture 46, the portion being discharged from the second communicating aperture 47, that is, the flow rate of the cooling water supplied to the heater 4.

The first communicating aperture 46 is larger in sectional area than the internal communicating aperture 50. This creates a lower flow resistance when the cooling water is introduced after flowing out of the first water channel 2a, as compared to a case where the first communicating aperture 46 is smaller in sectional area than the internal communicating aperture 50.

The MCV8 has the seal member 59 which includes the annular first sealing portion 59a encircling the first communicating aperture 46, and the annular second sealing portion 59b encircling the second communicating aperture 47. The three mounting bosses 16b for fixing the housing 10 to the engine 2 are arranged around the first communicating aperture 46. The first communicating aperture 46 receives the largest pressure among the communicating apertures of the housing 10. At the first communicating aperture 46, therefore, a sufficient pressing force can be imparted to (the first sealing portion 59a of) the seal member 59, which improves the sealability of the seal member 59. In addition, a gap between the first communicating aperture 46 and the first water channel 2a, and a gap between the second communicating aperture 47 and the second water channel 2b, can be sealed with the seal member 59 alone, which is a single integrated seal member. In other words, sealing reliability at the two sealing positions are enhanced by assuring the sealability of the single seal member, namely, the seal member 59. The sealing reliability can be therefore more easily enhanced, as compared to a case where gaps at two sealing positions are sealed with separate seal members.

The housing 10 includes the internal passage 57 in communication with the second communicating aperture 47, and the internal communicating aperture 50 which connects the internal passage 57 and the valve-element housing portion 44 to each other. A U-turn path is accordingly created within the housing 10, establishing a portless structure. In this portless structure, the first and second communicating apertures 46 and 47 open in the engine-side mounting surface 16a. The housing 10 includes the connecting path 48 extending from the internal communicating aperture 50 to the outside of the housing 10, and the water conduit 45 which connects the connecting path 48 and the second communicating aperture 47 to each other. The housing 10 further includes the cap 51 which closes the opening 48a of the connecting path 48. The cap 51 is provided inside with the communicating path 52d which connects the internal communicating aperture 50 and the water conduit 45 to each other. The internal passage 57 therefore can be formed simply by closing the opening 48a with the cap 51. The interior of the housing 10 is accessible from the opening 48a, so that the internal communicating aperture 50 can be formed, for example, by drilling or another method. This provides a simpler mold construction, as compared to when the internal communicating aperture 50 is formed during mold injection.

The engine-side mounting surface 16a extends in the direction orthogonal to the x-axis extending along a rotation axis of the rotor 12. The first and second communicating apertures 46 and 47 open in the x-axis direction. At the time of mounting the rotor 12 on the housing 10, therefore, the rotor 12 can be inserted into the valve-element housing portion 44 from the first communicating aperture 46 which does not have to be closed. The mounting efficiency is consequently improved.

According to the MCV8 of the Embodiment 1, the extending portion 40 of the rotor 12 is made to overlap the bearing 60 of the housing 10 in the x-axis direction for the purpose of avoiding an increase in x-axial dimension of the housing 10. The extending portion 40 accordingly protrudes into an internal space of the rotor 12. A cooling water flow, which starts from the first opening 37 to run in the x-axis negative direction, therefore collides with the extending portion 40 to stagnate. This raises a possibility that the flow resistance is increased. The effect of the extending portion 40 can be reduced if the openings of the rotor 12 are arranged on the x-axis positive direction side of the extending portion 40. Such arrangement, however, increases the x-axial dimension of the rotor 12. According to the Embodiment 1, therefore, the distal end 40a of the extending portion 40 has a tapered shape. The tapered shape of the distal end 40a creates a cooling water flow which runs in the radially outward direction along the outer peripheral surface of the distal end 40a, or the guide surface 40d, allowing the cooling water to smoothly flow from the first opening 37 to the second opening 38. The tapered shape of the distal end 40a further makes the cooling water flow less likely to collide with the extending portion 40 and thus prevents or reduces the occurrence of a stagnation around the extending portion 40. Consequently, the flow resistance within the rotor 12 can be prevented from increasing. In addition, the extending portion 40 has the guide portion 40c connected to the opening edge of the second opening 38. The cooling water flow runs from the first opening 37 toward the second opening 38 along the shape of the guide portion 40c, enabling the cooling water to flow more smoothly. This also prevents an increase in flow resistance within the rotor 12.

The second communicating aperture 47 opens in one of the three mounting bosses 16b for mounting the housing 10 on the MCV mounting surface 2c of the engine 2. This way, a mounting area of the MCV8 (area of the engine-side mounting surface 16a) is smaller, as compared to a case where the second communicating aperture 47 opens in a place other than the mounting bosses 16b. The MCV8 is accordingly downsized.

The MCV8 includes the seal member 58 for preventing the cooling water from leaking from the second opening 38 or the internal communicating aperture 50 into the gap between the valve-element housing portion 44 and the rotor 12. The seal member 58 is biased toward the rotor 12 by the cap 51. This allows the mounting of the seal member 58 and the setup of the internal passage 57 to be completed simply by inserting the cap 51 into the connecting path 48 together with the seal member 58, improving the mounting efficiency.

The internal passage 57 is formed within the reinforcing rib 28. This makes it possible to use the reinforcing rib 28 to increase the strength of the housing 10, and at the same time, to profitably use the internal space of the reinforcing rib 28 as a cooling water channel. The reinforcing rib 28 has a hollow structure, which contributes to a reduction in a weight of the MCV8.

The reinforcing rib 28 is connected to one of the three mounting bosses 16b. The mounting bosses 16b are thus increased in strength by the reinforcing rib 28.

The reinforcing rib 28 is connected to the outer wall 27a of the motor housing portion 27 which houses the electric motor 22. The reinforcing rib 28 thus increases the strength of the motor housing portion 27. Although vibrations from outside, such as the vibration of the engine 2, negatively affect the electric motor 22, the increased strength of the motor housing portion 27 can mitigate the impact of the external vibrations on the electric motor 22.

The housing 10 includes the first outlet 17 connected to the radiator 3. The first outlet 17 protrudes from a different surface from the engine-side mounting surface 16a (outer peripheral surface of the peripheral wall 15). This facilitates the pipe mounting on the radiator 3 which is configured differently from the engine 2.

Embodiment 2

An Embodiment 2 will be now explained. As the Embodiment 2 is similar in basic constitution to the Embodiment 1, the following description refers only to different parts from the Embodiment 1.

Figure 8:
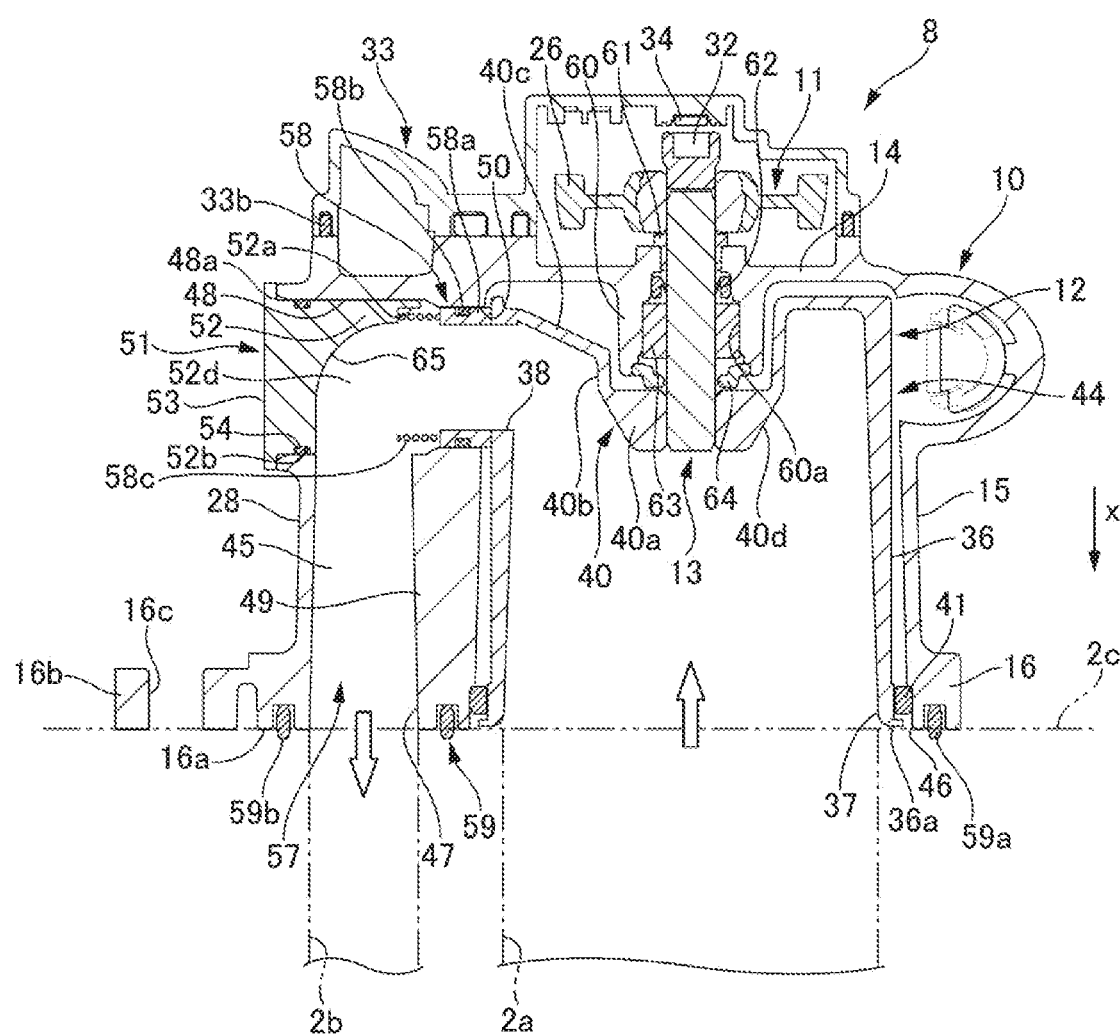
FIG. 8 is an end view of an MCV8 according to an Embodiment 2 along the line S6-S6 of FIG. 4.
Figure 9:
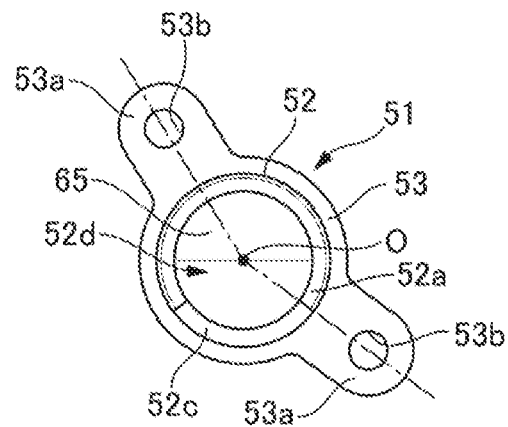
FIG. 9 is an elevation view of a cap 51 according to the Embodiment 2.

FIG. 8 is an end view of an MCV8 according to the Embodiment 2 along the line S6-S6 of FIG. 4. FIG. 9 is an elevation view of a cap 51 according to the Embodiment 2. The MCV8 of the Embodiment 2 differs in the shape of the cap 51 from the MCV8 of the Embodiment 1. The cap 51 includes inside an R-shaped portion 65. The R-shaped portion 65 smoothly connects an inner peripheral surface of a cylindrical portion 52 and an inner lateral surface of a flange portion 53 to each other in the form of a surface with predetermined curvature. The center of curvature of the R-shaped portion 65 is on the inner side of the cap 51.

The flange portion 53 of the Embodiment 2 has a rotationally asymmetric shape relative to a point on a central axis line 0, as viewed from an axial direction of the cylindrical portion 52. Threaded holes 56, 56 located on a housing 10 side are arranged in the same way.

The following description explains operation and advantageous effects of the MCV8 of the Embodiment 2.

A communicating path 52d has the R-shaped portion 65 in an outer-side inner peripheral surface thereof. In the communicating path 52d, accordingly, a cooling water flow is created, which runs along the R-shaped portion 65 toward an x-axis positive direction side. The R-shaped portion 65 makes the cooling water flow less likely to collide with the flange portion 53, which prevents or reduces the occurrence of a stagnation around the flange portion 53. More specifically, an internal communicating aperture 50 and a water conduit 45 are connected in a continuous manner through the communicating path 52d, so that the cooling water smoothly flows from the internal communicating aperture 50 to the water conduit 45. This prevents an increase in flow resistance within the communicating path 52d. In this specification, to be "connected in a continuous manner" means that the outer-side inner peripheral surface of the communicating path 52d does not include any portion perpendicular to a flowing direction of the cooling water. To be more precise, in a route through which the cooling water runs along an outer-side outer peripheral surface of the communicating path 52d from the internal communicating aperture 50 side toward the water conduit 45, there is no point where a direction of tangent on the outer side of the inner peripheral surface changes at an angle of 90 degrees or more.

The flange portion 53 of the cap 51 has the rotationally asymmetric shape relative to the point on the central axis line 0. This allows the cap 51 to be fixed to the housing 10 with a pair of screws 55 only when a rotation angle (position around the central axis line 0) of the cap 51 is a proper rotation angle (only when a cut-away portion 52c faces in the x-axis positive direction). The cap 51 is thus prevented from being fixed to the housing 10 at an improper rotation angle (a rotation angle at which the cut-away portion 52c faces in an x-axis negative direction). In other words, at the time of fixing the cap 51 to the housing 10, the cap 51 can be fixed to the housing 10 at a correct rotation angle without the need of checking the orientation of the cut-away portion 52c.

Embodiment 3

An Embodiment 3 will be explained below. As the Embodiment 3 is similar in basic constitution to the Embodiment 1, the following description refers only to different parts from the Embodiment 1.

Figure 10:
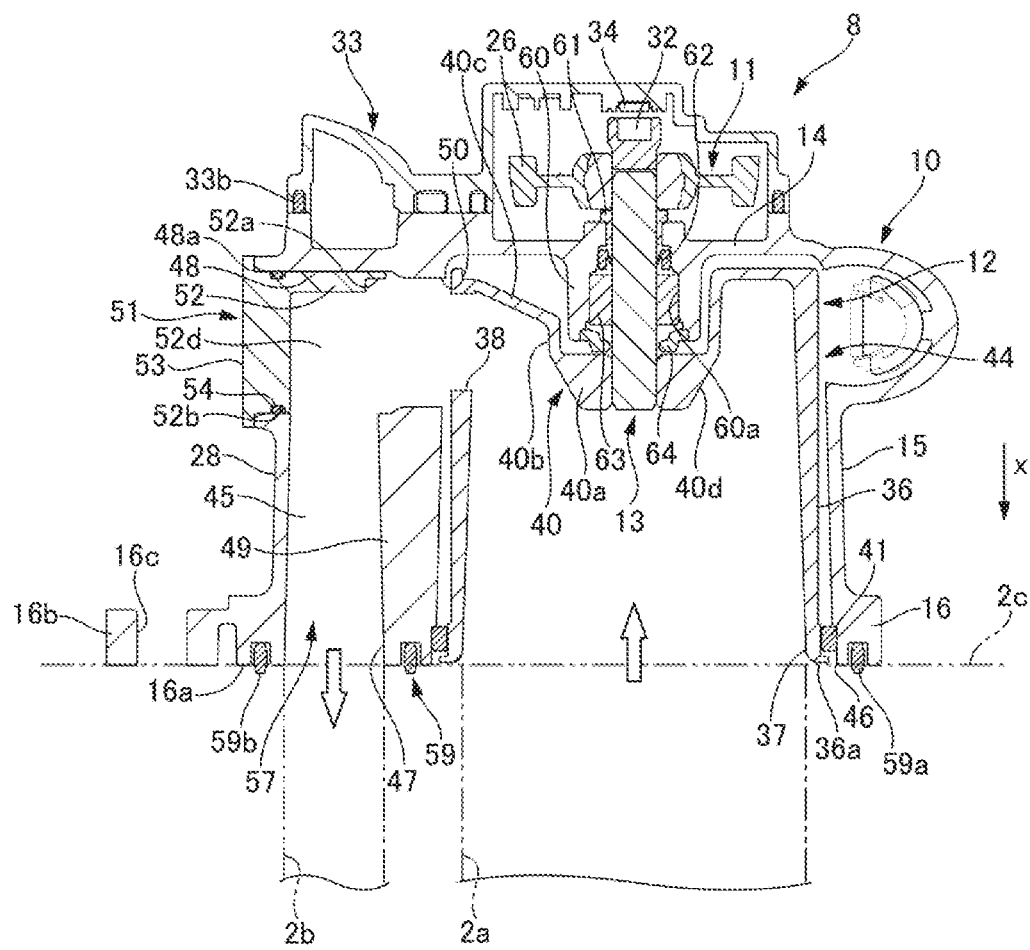
FIG. 10 is an end view of an MCV8 according to an Embodiment 3 along the line S6-S6 of FIG. 4.

FIG. 10 is an end view of an MCV8 according to the Embodiment 3 along the line S6-S6 of FIG. 4. The MCV8 of the Embodiment 3 differs from that of the Embodiment 1 in that the MCV8 of the Embodiment 3 has a seal-less structure between a second opening 38 and an internal communicating aperture 50. To be more specific, the MCV8 of the Embodiment 3 does not have the seal member 58 shown in FIGS. 1 and 6. This reduction of the number of components reduces costs.

Embodiment 4

An Embodiment 4 will be now explained. The following description refers only to different parts from the Embodiment 1.

Figure 11:
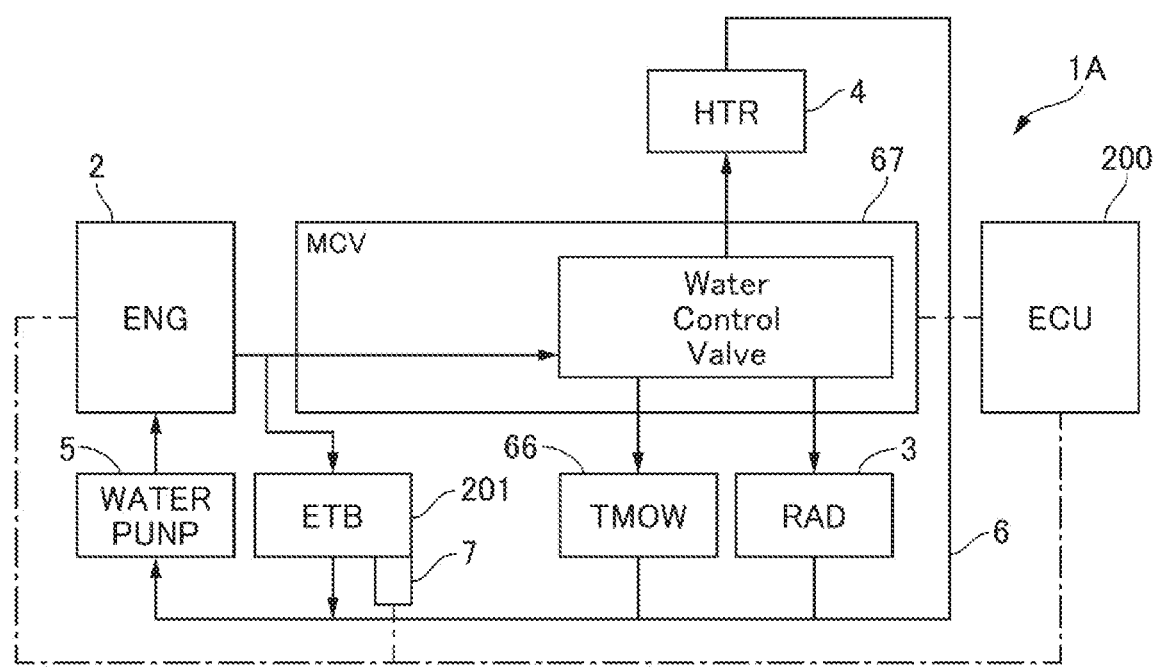
FIG. 11 is a schematic view of a cooling system 1A according to an Embodiment 4.

FIG. 11 is a schematic view of a cooling system 1A according to the Embodiment 4.

The cooling system 1A of the Embodiment 4 includes, as heat exchangers, not only a radiator 3 and a heater 4 but also a transmission oil warmer 66. The transmission oil warmer 66 cools cooling water through heat exchange between the cooling water and transmission oil. The transmission oil warmer 66 increases temperature of the transmission oil when an engine 2 is cold. The transmission oil warmer 66 further functions as an oil cooler for cooling the transmission oil after the engine 2 is warmed up. An electronic control throttle body 201 controls a throttle opening degree according to temperature of the cooling water which has flown out of the engine 2. The cooling water which has flown into the electronic control throttle body 201 is returned to a suction side of a water pump 5. An MCV67 is a flow control valve configured to adjust a flow rate of the cooling water which is supplied from the engine 2 to the heat exchangers 3, 4 and 66.

Figure 12:
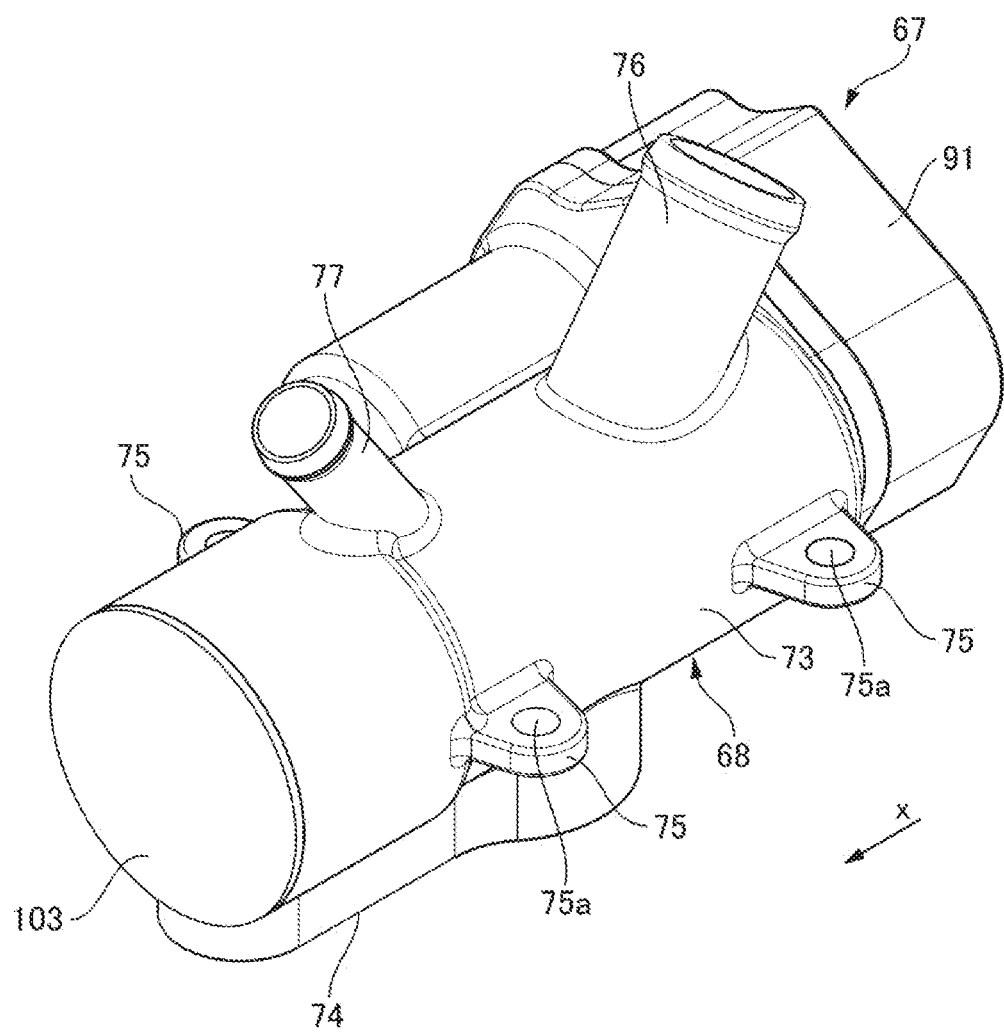
FIG. 12 is a perspective view of an MCV 67 according to the Embodiment 4.
Figure 13:
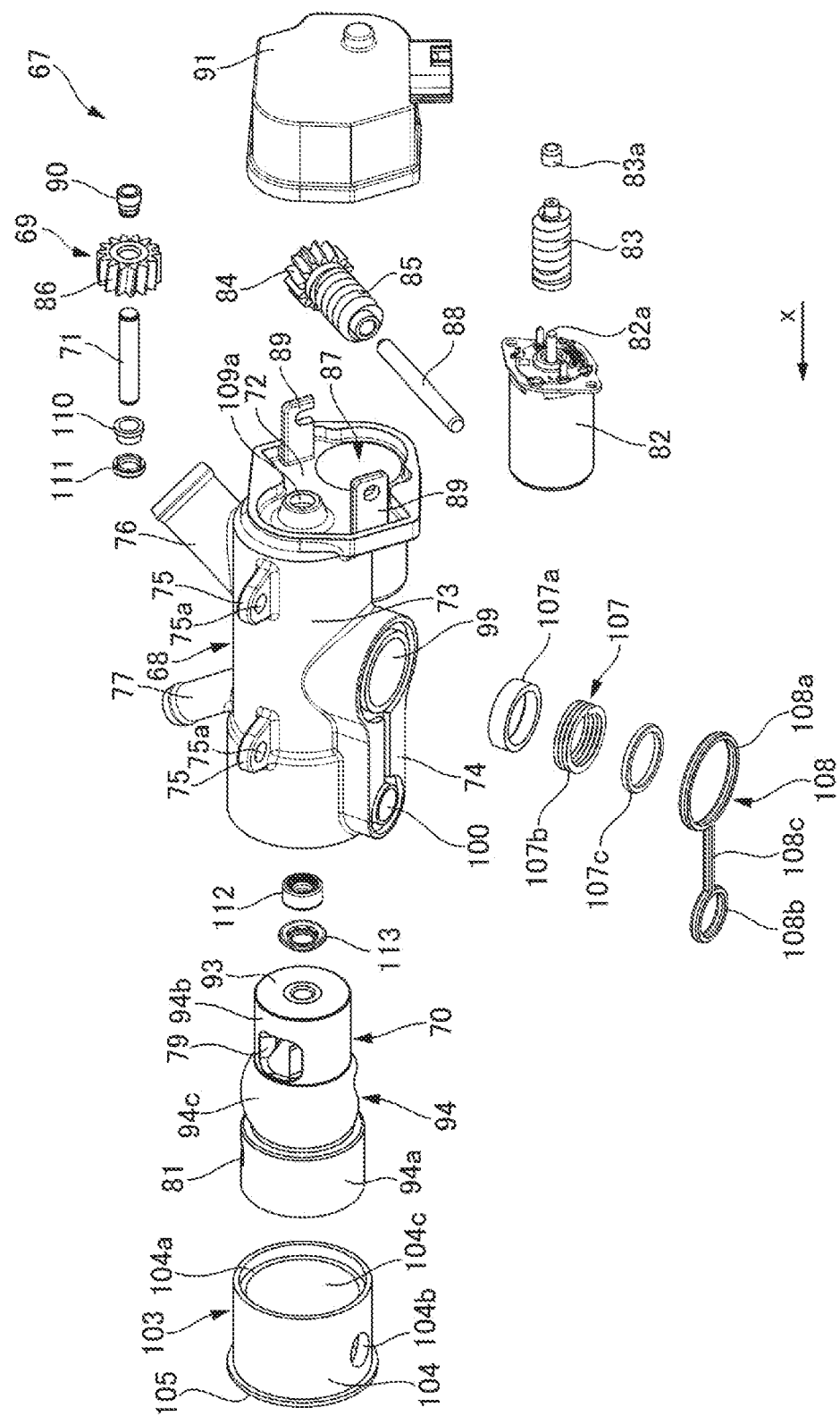
FIG. 13 is an exploded perspective view of the MCV 67 according to the Embodiment 4.
Figure 14:
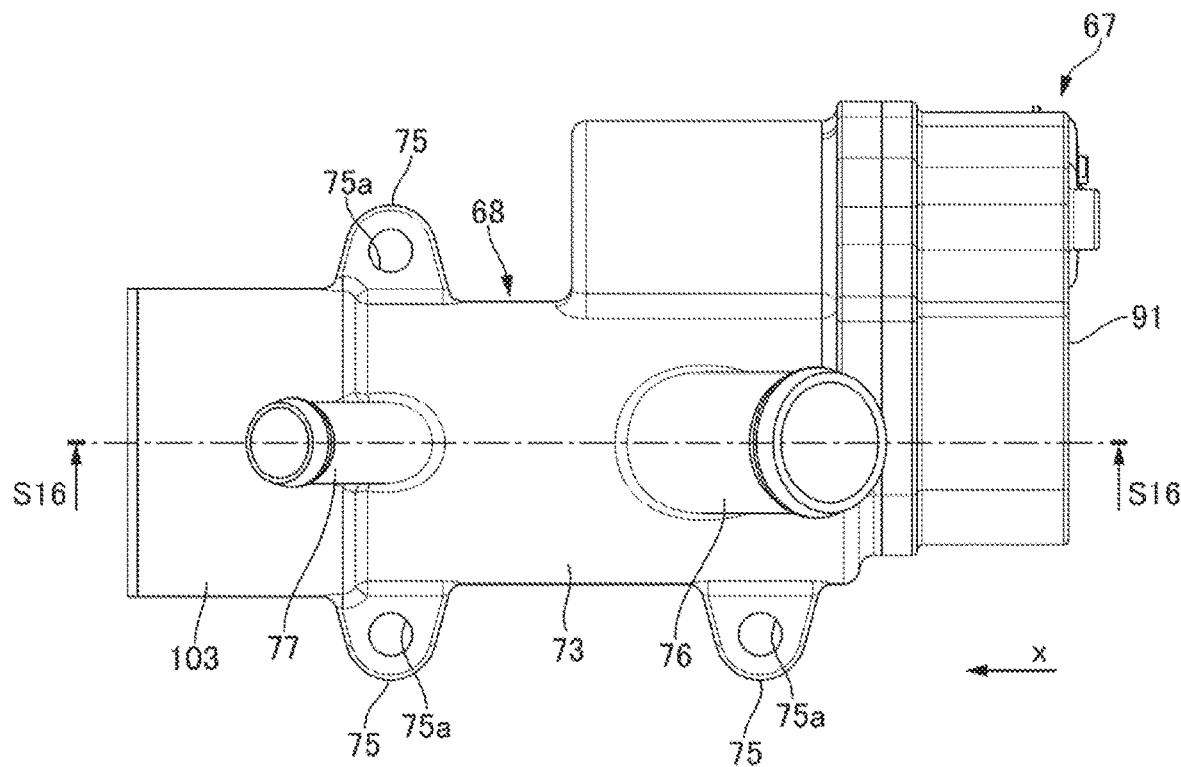
FIG. 14 is a plan view of the MCV67 according to the Embodiment 4.
Figure 15:
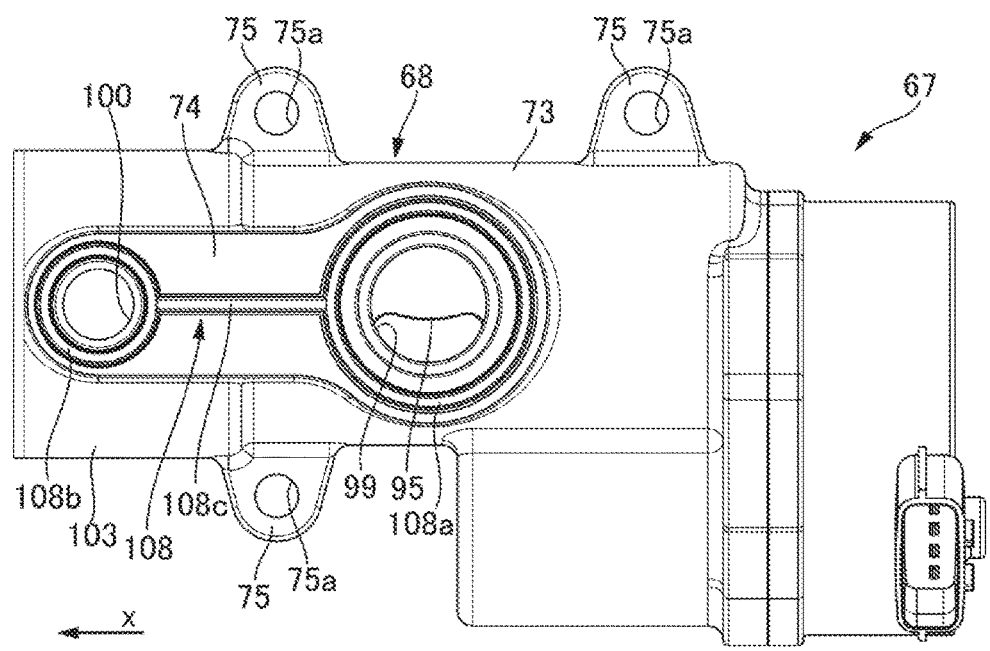
FIG. 15 is a bottom view of the MCV67 according to Embodiment 4.
Figure 16:
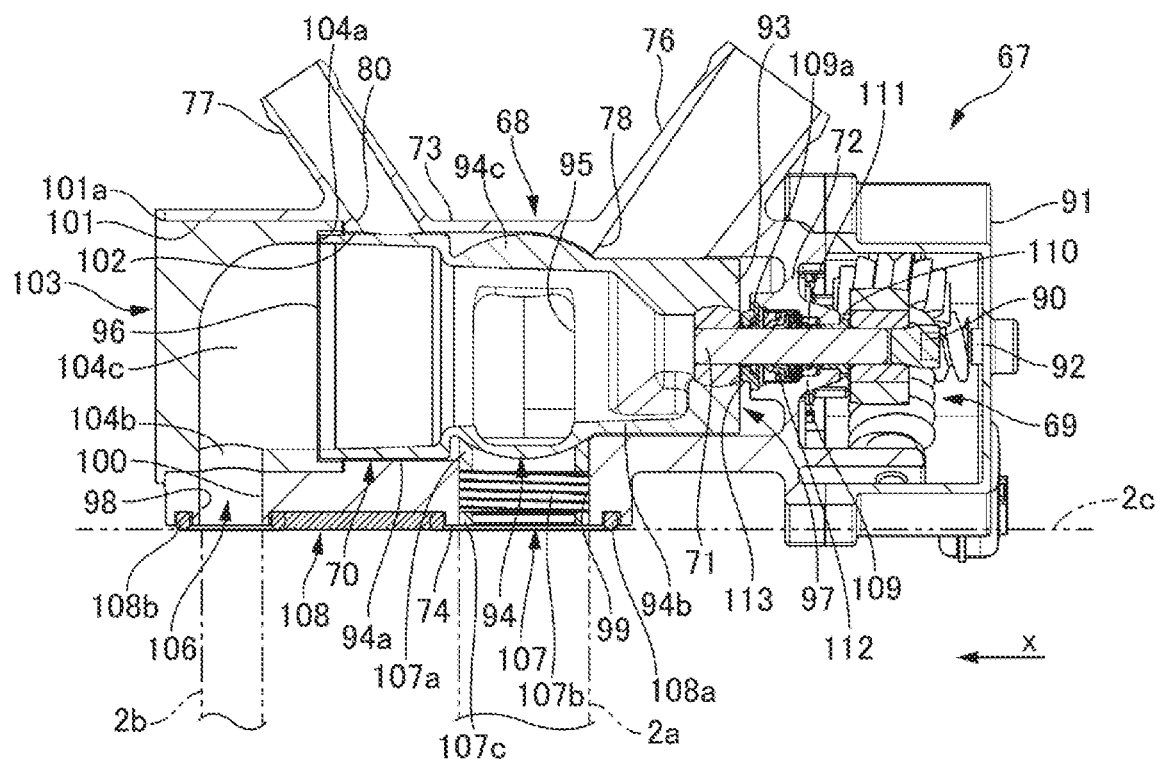
FIG. 16 is a sectional view along the line S16-S16 of FIG. 14.

FIG. 12 is a perspective view of the MCV 67 according to the Embodiment 4. FIG. 13 is an exploded perspective view of the MCV 67 according to the Embodiment 4. FIG. 14 is a plan view of the MCV67 according to the Embodiment 4. FIG. 15 is a bottom view of the MCV67 according to Embodiment 4. FIG. 16 is a sectional view along the line S16-S16 of FIG. 14.

The MCV67 includes a housing 68, a drive mechanism (actuator) 69, a rotor (valve element) 70, and a rotary shaft 71. The following description is based on the assumption that there is an x-axis extending along a rotation axis of the rotary shaft 71. Hereinafter, a direction from the drive mechanism 69 toward the rotor 70 along the x-axis is referred to as an x-axis positive direction, and the other direction as an x-axis negative direction. A radiation direction of the x-axis is referred to as a radial direction, and a direction around the x-axis as a circumferential direction.

The housing 68 is formed, for example, by mold injection using a synthetic resin material. The housing 68 has a base 72 and a peripheral wall 73. The base 72 has a substantially disc-like shape which extends in the direction orthogonal to the x-axis. The rotary shaft 71 extends through a center of the base 72. The peripheral wall 73 has a substantially cylindrical shape which extends in an x-axis positive direction from an outer periphery of the base 72. The housing 68 accommodates the rotor 70 so as to allow the rotor 70 to rotate in the circumferential direction. The housing 68 has a bottom surface which is an engine-side mounting surface 74 attached to an MCV mounting surface 2c of the engine 2. The engine-side mounting surface 74 is a flat surface extending along the x-axis. The housing 68 includes three mounting bosses 75 protruding in a radially outward direction. Screw insertion holes 75a extend through the mounting bosses 75. The housing 68 is mounted on the MCV mounting surface 2c of the engine 2 with screws, not shown, inserted in the screw insertion holes 75a. The MCV mounting surface 2c is a flat surface.

A first outlet (radiator water conduit) 76 and a second outlet 77, which serve as pipe joints, protrude radially outward from the peripheral wall 73 of the housing 68. The first outlet 76 connects a third communicating aperture 78 formed in the peripheral wall 73 to a water channel leading toward the radiator 3. When the rotor 70 is positioned within a predetermined rotation angle range, the third communicating aperture 78 radially overlaps (coincides with) a third opening 79 formed in the rotor 70. An overlapping amount varies with the rotation angle of the rotor 70. The second outlet 77 connects a fourth communicating aperture 80 formed in the peripheral wall 73 to a water channel leading toward the transmission oil warmer 66. When the rotor 70 is positioned within a predetermined rotation angle range, the fourth communicating aperture 80 radially overlaps a fourth opening 81 formed in the rotor 70. An overlapping amount varies with the rotation angle of the rotor 70. The fourth communicating aperture 80 is located on the x-axis positive direction side of the third communicating aperture 78. The configuration of the housing 68 will be described later in detail.

The drive mechanism 69 is located in the x-axis negative direction side of the base 72. The drive mechanism 69 rotationally drives the rotary shaft 71 to control the rotation angle of the rotor 70. The drive mechanism 69 includes an electric motor 82, a motor worm 83, an intermediate gear 84, an intermediate worm 85, and a rotor gear 86. The electric motor 82 is controlled by an engine control unit 200. The electric motor 82 is accommodated in a motor housing portion (actuator housing portion) 87 formed in the peripheral wall 73 of the housing 10, with an output shaft 82a directed in the x-axis negative direction. The electric motor 82 is fixed within the motor housing portion 87 by two screws, not shown. The output shaft 82a extends through the motor worm 83. The motor worm 83 rotates integrally with the output shaft 82a. The output shaft 82a has a distal end to which a cap 83a is fixed. The intermediate gear 84 is engaged with the motor worm 83. The intermediate worm 85 is integral with the intermediate gear 84.

A shaft 88 is press-fitted in the intermediate gear 84 and the intermediate worm 85. The shaft 88 is rotatably supported by a pair of brackets 89, 89. The pair of brackets 89, 89 protrude from the base 72 in the x-axis negative direction. The rotor gear 86 is fixed to an x-axis negative direction end of the rotary shaft 71 and rotates integrally with the rotary shaft 71. A magnet 90 is mounted on the x-axis negative direction end of the rotary shaft 71. The motor worm 83, the intermediate gear 84, the intermediate worm 85, and the rotor gear 86 are accommodated in a gear housing 91. The gear housing 91 includes an MR sensor 92. The MR sensor 92 detects the rotation angle of the rotary shaft 71, or the rotation angle of the rotor 70, on the basis of a magnetic field change along with the rotation of the rotary shaft 71. The rotation angle detected by the MR sensor 92 is transmitted to the engine control unit 200. The gear housing 91 is mounted on the base 72.

The rotor 70 is formed, for example, by mold injection using a synthetic resin material. The rotor 70 includes a bottom 93, an outer peripheral portion 94, a first opening 95, a second opening 96, a third opening 79, and a fourth opening 81. The outer peripheral portion 94 has a substantially cylindrical shape which extends from an outer periphery of the bottom 93 in the x-axis positive direction. The outer peripheral portion 94 includes a large-diameter portion 94a, a small-diameter portion 94b, and a spherical portion 94c. The large-diameter portion 94a has a substantially cylindrical shape and is located on the x-axis positive direction side of the spherical portion 94c. The large-diameter portion 94a is provided with the fourth opening 81. The small-diameter portion 94b has a substantially cylindrical shape and is located on the x-axis negative direction side of the spherical portion 94c. The small-diameter portion 94b is smaller in outer diameter than the large-diameter portion 94a. The small-diameter portion 94b is provided with the third opening 79. The spherical portion 94c has a substantially spherical shape. The spherical portion 94c is substantially equal in outer diameter to the large-diameter portion 94a. The spherical portion 94c is provided with the first opening 95.

The configuration of the housing 68 will be now described in detail with reference chiefly to FIG. 16.

The housing 68 includes a valve-element housing portion 97, a water conduit 98, a first communicating aperture 99, a second communicating aperture 100, and a connecting path 101.

The valve-element housing portion 97 is a substantially column-like space formed within the housing 68 and extending in the x-axis direction. The valve-element housing portion 97 accommodates the rotor 70 so as to allow the rotor 70 to rotate in the circumferential direction. The third communicating aperture 78 and the fourth communicating aperture 80, which are formed in the peripheral wall 73, open in the valve-element housing portion 97.

The water conduit 98 is a space located on the x-axis positive direction side of the valve-element housing portion 97 and extending in the direction orthogonal to the x-axis. The water conduit 98 is in communication with the valve-element housing portion 97 through an internal communicating aperture 102.

The first communicating aperture 99 is an opening which opens in the engine-side mounting surface 74 of the housing 68. The first communicating aperture 99 is in communication with the valve-element housing portion 97. The first communicating aperture 99 is an introduction port configured to introduce the cooling water, which has flown out of a first water channel 2a, to the valve-element housing portion 97.

The second communicating aperture 100 is an opening which opens in the engine-side mounting surface 74 and is in communication with the water conduit 98. The second communicating aperture 100 is a discharge port configured to discharge the cooling water in the water conduit 98 to the second water channel 2b of the engine 2. The second communicating aperture 100 is smaller in opening area than the first communicating aperture 99.

Figure 17A:
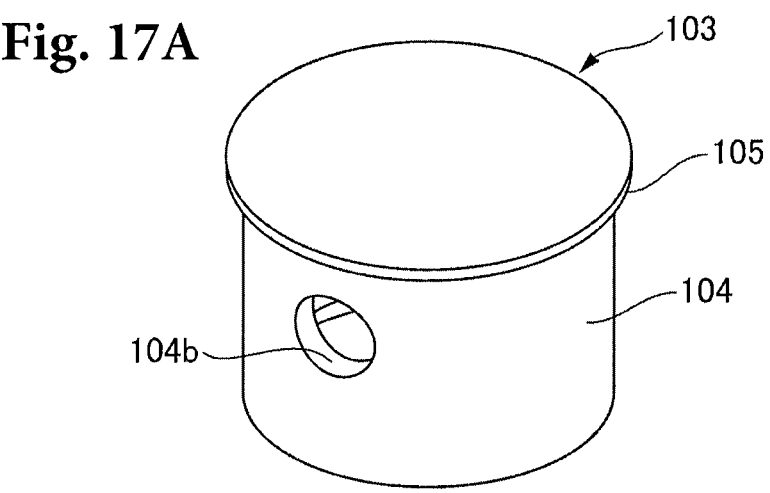
FIG. 17A is a perspective view of a cap 103 according to the Embodiment 4.
Figure 17B:
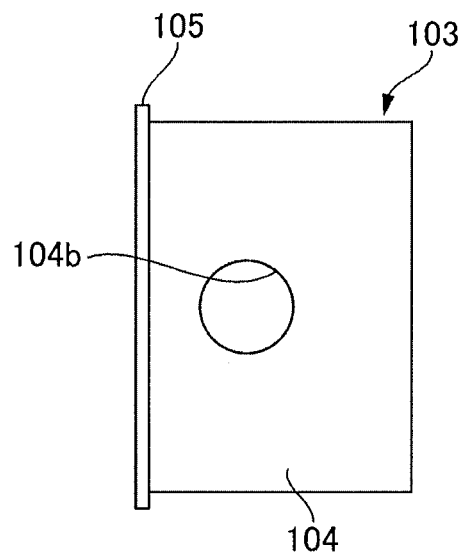
FIG. 17B is an elevation view of the cap 103.
Figure 18A:
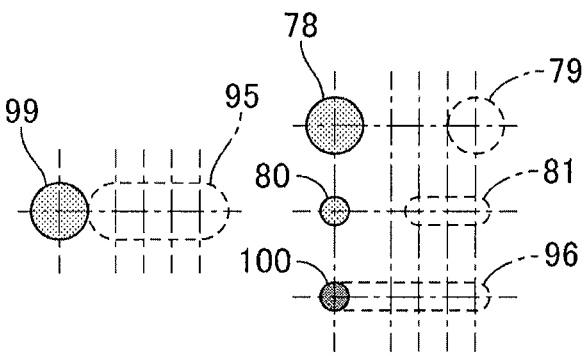
FIG. 18D is an explanatory view showing operating positions of the MCV67 according to the Embodiment 4.
Figure 18B:
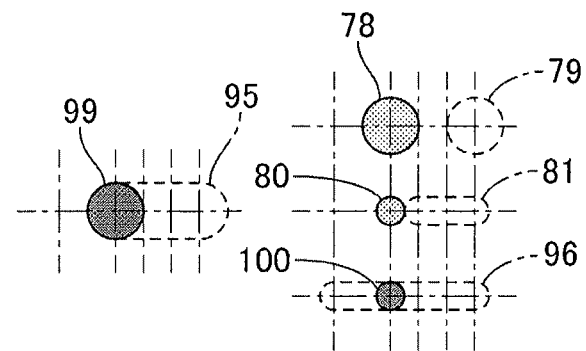
Figure 18C:
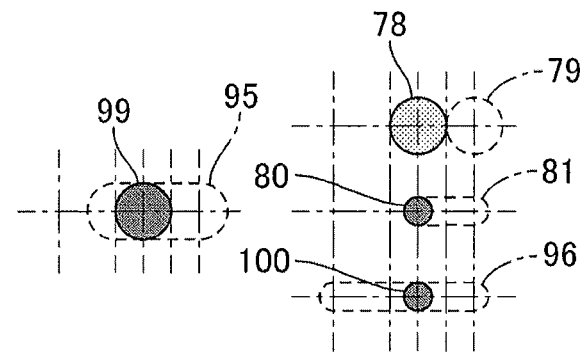
Figure 18D:
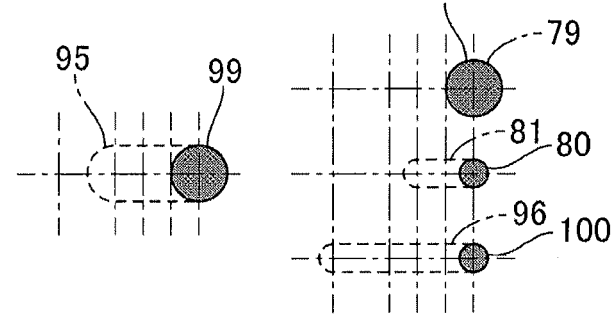

The connecting path 101 is located on a radially inner side of the water conduit 98. The connecting path 101 is a substantially column-like space extending from the internal communicating aperture 102 in the x-axis positive direction. The connecting path 101 extends to the outside of the housing 68. The connecting path 101 is closed by a cap 103. The cap 103 is formed, for example, by mold injection using a synthetic resin material. The cap 103 is inserted into the connecting path 101 from an opening 101a of the connecting path 101. The opening 101a is formed in an x-axis positive direction end of the housing 68. FIG. 17A is a perspective view of the cap 103, and FIG. 17B is an elevation view of the cap 103. The cap 103 has a cylindrical portion 104 and a flange portion 105.

The cylindrical portion 104 has such an outer diameter so as to allow the cylindrical portion 104 to be inserted in the connecting path 101, and such an axial length so as to allow the cylindrical portion 104 to reach the internal communicating aperture 102. The cylindrical portion 104 is provided with a stepped portion 104*a* in an inner peripheral side of a distal end portion thereof. The stepped portion 104*a* is located on a proximal end side (flange portion 105 side) of an outer peripheral side of the distal end portion of the cylindrical portion 104. The stepped portion 104*a* overlaps an x-axis positive direction end of the rotor 70 in the x-axis direction. The cylindrical portion 104 is provided with an opening 104*b* which faces the second communicating aperture 100. The opening 104*b* is substantially equal in outer diameter to the second communicating aperture 100. An internal space of the cylindrical portion 104 and the opening 104*b* of the cylindrical portion 104 serve as a communicating path 104*c* which connects the water conduit 98 and the internal communicating aperture 102 to each other. The communicating path 104*c*, the water conduit 98, and the internal communicating aperture 102 constitutes an internal passage 106 which connects the second communicating aperture 100 and the internal communicating aperture 102 to each other. The flange portion 105 is formed in the proximal end side of the cylindrical portion 104 in an integral manner with the cylindrical portion 104. The flange portion 105 has a disc-like shape and is larger in outer diameter than the opening 101*a* of the connecting path 101.

A seal member 107 is attached to the first communicating aperture 99. The seal member 107 prevents the cooling water from leaking from the first opening 95 or the first communicating aperture 99 into a gap between the valve-element housing portion 97 and the rotor 70. The seal member 107 includes a rotor seal 107*a*, a coil spring 107*b*, and a retainer 107*c*. The rotor seal 107*a* has a cylindrical shape and is inserted in the first communicating aperture 99. The rotor seal 107*a* is displaceable relative to the first communicating aperture 99. The rotor seal 107*a* has a distal end in contact with the spherical portion 94*c*. The coil spring 107*b* is disposed, in a contracted position, between the rotor seal 107*a* and the retainer 107*c* to bias the rotor seal 107*a* toward an outer peripheral portion 36. The retainer 107*c* is, for example, tucked in the first communicating aperture 99 to be fixed to the first communicating aperture 99.

A seal member 108 is attached to the engine-side mounting surface 74 of the housing 68. The seal member 108 seals a gap between the engine-side mounting surface 74 and the MCV mounting surface 2*c*. The seal member 108 has a first sealing portion 108*a*, a second sealing portion 108*b*, and a connecting portion 108*c*. The first sealing portion 108*a* has an annular shape which encircles a peripheral edge of the first communicating aperture 99. The second sealing portion 108*b* encircles the second communicating aperture 100. The connecting portion 108*c* has a linear shape and connects the first sealing portion 108*a* and the second sealing portion 108*b* to each other.

The housing 68 has a bearing 109. The bearing 109 supports the rotary shaft 71 in such a way that the rotary shaft 71 is rotatable with respect to the housing 68. The bearing 109 has a substantially cylindrical shape extending in the x-axis direction. The bearing 109 protrudes from a central portion of the base 72 in the x-axis positive direction. In a center of the bearing 109, there is formed a through-hole 109*a* through which the rotary shaft 71 extends. Disposed in the through-hole 109 of the bearing 109 are a radial thrust bearing 110, a dust seal 111, a liquid-tight seal 112, and a thrust bearing 113. The radial thrust bearing 110 is located in an x-axis negative direction end of the bearing 109 and receives radial and x-axial forces from the rotary shaft 71. The dust seal 111 is located between the radial thrust bearing 110 and the liquid-tight seal 112 in the x-axis direction. The dust seal 111 prevents the cooling water, which has flown into the inside of the bearing 109, from entering the drive mechanism 69. The liquid-tight seal 112 is located between the dust seal 111 and the thrust bearing 113 in the x-axis direction. The liquid-tight seal 112 prevents the cooling water from flowing out of the valve-element housing portion 97. The thrust bearing 113 is located in an x-axis positive direction end of the bearing 109 and receives an x-axial force from the rotary shaft 71.

FIG. 18 is an explanatory view showing operating positions of the MCV 67 according to the Embodiment 4. FIG. 18 schematically illustrates communication of the communicating apertures 99, 100, 78 and 80 with the openings 95, 96, 79 and 81, respectively. FIG. 18A, FIG. 18B, FIG. 18C and FIG. 18D respectively show a fully closed position, a first open position, a second open position, and a fully open position. In FIG. 18, the lightly hatched communicating apertures 99, 100, 78 and 80 are not in communication with their respective openings 95, 96, 79 and 81, whereas the heavily hatched communicating apertures 99, 100, 78 and 80 are in communication with their respective openings 95, 96, 79 and 81.

When the MCV 67 is in the fully closed position, the communicating apertures 99, 78 and 80 are not in communication with the openings 95, 79 and 81. Due to this non-communicating state, the cooling water is prevented from flowing to the radiator 3, the heater 4, and the transmission oil warmer 66.

When the MCV 67 is in the first open position, the first communicating aperture 99 and the first opening 95 are in communication with each other; the second communicating aperture 100 and the second opening 96 are in communication with each other; the third communicating aperture 78 and the third opening 79 are not in communication with each other; and the fourth communicating aperture 80 and the fourth opening 81 are not in communication with each other. The cooling water which flows out of the engine 2 therefore flows through the heater 4.

When the MCV 67 is in the second open position, the first communicating aperture 99 and the first opening 95 are in communication with each other; the second communicating aperture 100 and the second opening 96 are in communication with each other; the third communicating aperture 78 and the third opening 79 are not in communication with each other; and the fourth communicating aperture 80 and the fourth opening 81 are in communication with each other. The cooling water which flows out of the engine 2 therefore flows through the heater 4 and the transmission oil warmer 66.

When the MCV 67 is in the fully open position, the first communicating aperture 99 and the first opening 95 are in communication with each other; the second communicating aperture 100 and the second opening 96 are in communication with each other; the third communicating aperture 78 and the third opening 79 are in communication with each other; and the fourth communicating aperture 80 and the fourth opening 81 are in communication with each other. The cooling water which flows out of the engine 2 therefore flows through the radiator 3, the heater 4, and the transmission oil warmer 66.

The following description explains operation and advantageous effects of the Embodiment 4.

The MCV 67 of the Embodiment 4 is so configured that the first communicating aperture 99 and the second communicating aperture 100 both open in the engine-side mounting surface 74 to be connected directly to the first water channel 2*a* and the second water channel 2*b*. The first communicating aperture 99 serves as an introduction port configured to introduce the cooling water, which has flown out of the first water channel 2a, to the valve-element housing portion 97. The second communicating aperture 100 serves as a discharge port configured to discharge to the second water channel 2b the cooling water, which has flown out from the valve-element housing portion 97 to the internal passage 106. In short, the MCV67 includes a portless structure between the MCV67 and the engine 2. This portless structure makes it possible to complete the pipe mounting between the MCV67 and the engine 2 simply by mounting the housing 68 on the engine 2. Since the pipe mounting between the MCV67 and the engine 2 can be omitted, the mounting efficiency of the MCV67 is improved. The portless structure further eliminates the need for an outlet (pipe joint) for the second communicating aperture 100 and therefore simplifies the structure.

The engine control unit 200 controls the rotation angle of the rotor 70 and adjusts the overlapping (overlapping amount) of the first communicating aperture 99 and the first opening 95. It is then possible to arbitrarily control the flow rate of the cooling water discharged from the second communicating aperture 100, that is, the flow rate of the cooling water supplied to the heater 4.

The engine-side mounting surface 74 extends in the x-axis direction along the rotation axis of the rotor 70. The first communicating aperture 99 and the second communicating aperture 100 are arranged away from each other in a direction orthogonal to the x-axis. The engine-side mounting surface 74 is thus formed in a plane parallel with the rotation axis of the rotor 70. The first and second communicating apertures 99 and 100 therefore can be arranged in arbitrary positions along a direction of the rotation axis of the rotor 70. This provides a great degree of freedom in arranging layout, taking into account of the locations of the first and second water channels 2a and 2b.

The rotor 70 has the first opening 95 whose overlapping degree with the first communicating aperture 99 varies with the rotation angle of the rotor 70. The cooling water flowing from the engine side then can be controlled on an entry side of the MCV67, which, for example, accelerates the warm-up of the engine 2 during cold starting.

Embodiment 5

An Embodiment 5 will be now explained. As the Embodiment 5 is similar in basic constitution to the Embodiment 1, the following description refers only to different parts from the Embodiment 1.

Figure 19A:
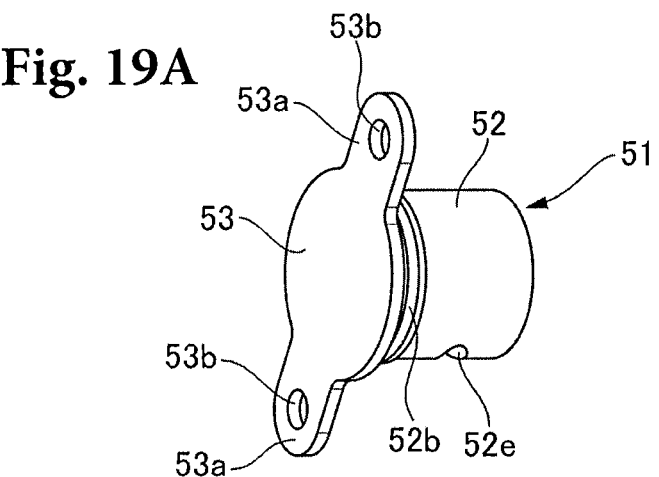
FIG. 19A is a perspective view of a cap 51 according to an Embodiment 5.
Figure 19B:
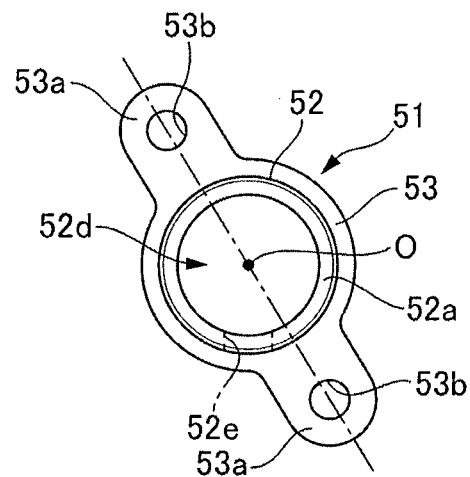
FIG. 19B is an elevation view of the cap 51.

FIG. 19A is a perspective view of a cap 51 according to the Embodiment 5, and FIG. 19B is an elevation view of the cap 51. The cap 51 includes a cylindrical portion 52 which is provided with an opening 52e facing a water conduit 45. The opening 52e is substantially equal in outer diameter to the water conduit 45. An internal space of the cylindrical portion 52 and the opening 52e of the cylindrical portion 52 serve as a communicating path 52d which connects the water conduit 45 and an internal communicating aperture 50 to each other. The communicating path 52d, the water conduit 45, and the internal communicating aperture 50 constitutes an internal passage 57 which connects a second communicating aperture 47 and the internal communicating aperture 50 to each other.

Embodiment 6

An Embodiment 6 will be explained below. As the Embodiment 6 is similar in basic constitution to the Embodiment 4, the following description refers only to different parts from the Embodiment 4.

Figure 20A:
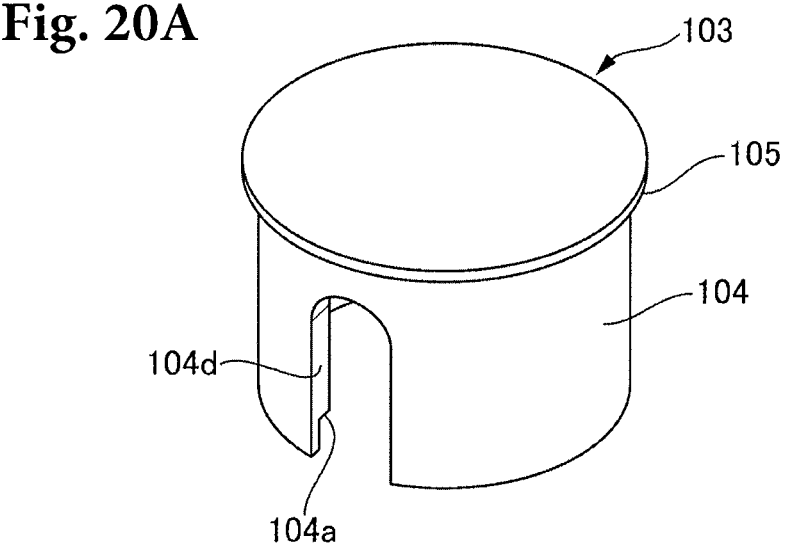
FIG. 20A is a perspective view of a cap 103 according to an Embodiment 6.
Figure 20B:
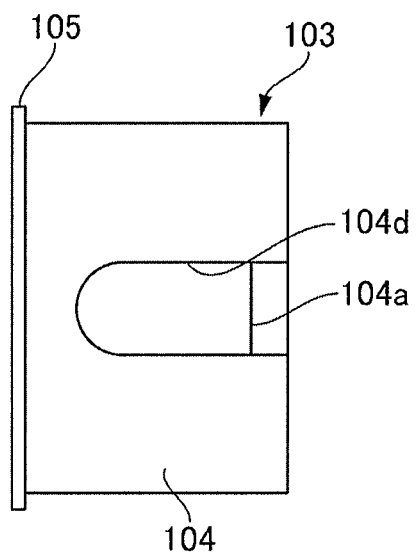
FIG. 20B is an elevation view of the cap 103.

FIG. 20A is a perspective view of a cap 103 according to the Embodiment 6, and FIG. 20B is an elevation view of the cap 103. The cap 103 includes a cylindrical portion 104. The cylindrical portion 104 has a distal end side provided with a cut-away portion 104d. The cut-away portion 104d extends from the distal end side of the cylindrical portion 104 toward a proximal end side of the cylindrical portion 104. The cut-away portion 104d has a width (circumferential length) substantially corresponding to an outer diameter of a second communicating aperture 100. An internal space of the cylindrical portion 104 and the cut-away portion 104d of the cylindrical portion 104 serve as a communicating path 104c which connects a water conduit 98 and an internal communicating aperture 102 to each other. The communicating path 104c, the water conduit 98, and the internal communicating aperture 102 constitute an internal passage 106 which connects the second communicating aperture 100 and the internal communicating aperture 102 to each other.

Other Embodiments

The embodiments for carrying out the invention have been explained. However, specific constitutions of the invention are not limited to the constitutions of the embodiments. The invention may be altered in design without deviating the gist thereof and includes equivalents thereto.

For example, the flow control valve may be mounted on the engine with an intermediate member intervening therebetween.

The flow control valve may be configured in any manner as long as at least the first and second communicating apertures open in the engine-side mounting surface. Any alteration may be made to the number and layout of the other communicating apertures and openings, the shape of the housing and of the valve element, etc. Each of the members may be made of any material.

Technical ideas which can be understood from the above-described embodiments will be described below.

The flow control valve of one aspect is a flow control valve comprising a housing including a valve-element housing portion, a first communicating aperture configured to introduce cooling water, which has flown out of a first water channel formed in an engine, to the valve-element housing portion or discharge the cooling water in the valve-element housing portion to a second water channel formed in the engine, and a second communicating aperture configured to discharge the cooling water in the valve-element housing portion to the second water channel or introduce the cooling water, which has flown out of the first water channel, to the valve-element housing portion; a valve element accommodated in the valve-element housing portion and configured to change a flow rate of the cooling water discharged to the second water channel, according to a rotation angle of the valve element; and an actuator configured to control the rotation angle of the valve element. The first and second communicating apertures open in an engine-side mounting surface of the housing.

In a more preferred aspect according to the above-described aspect, the housing includes an internal passage in communication with the second communicating aperture, and an internal communicating aperture which connects the internal passage and the valve-element housing portion to each other. The valve element has an opening whose overlapping degree with the first communicating aperture or the internal communicating aperture varies with the rotation angle of the valve element.

In another preferred aspect according to either one of the above-described aspects, the first or second communicating aperture, whichever communicating aperture introduces the cooling water, is larger in sectional area than the internal communicating aperture.

In still another preferred aspect according to any one of the above-described aspects, the flow control valve includes annular seal members which encircle the first communicating aperture and the second communicating aperture; the housing includes a plurality of mounting bosses for mounting the housing on the engine side; and the plurality of mounting bosses are arranged around the first or second communicating aperture, whichever communicating aperture introduces the cooling water.

In still another preferred aspect according to any one of the above-described aspects, the housing includes an internal passage in communication with the second communicating aperture, and an internal communicating aperture which connects the internal passage and the valve-element housing portion to each other. The internal passage includes a connecting path extending from the internal communicating aperture to the outside of the housing, and a water conduit which connects the connecting path and the second communicating aperture to each other. The housing is provided with a cap which closes the connecting path, the cap including inside a communicating path which connects the internal communicating aperture and the water conduit to each other.

In still another preferred aspect according to any one of the above-described aspects, the engine-side mounting surface extends in a direction intersecting with the rotation axis of the valve element. The first communicating aperture and the second communicating aperture open in the rotation axis direction.

In still another preferred aspect according to any one of the above-described aspects, the housing includes an internal passage in communication with the second communicating aperture, and an internal communicating aperture which connects the internal passage and the valve-element housing portion to each other. The valve element includes an opening whose overlapping degree with the internal communicating aperture varies with a rotation angle of the valve element.

In still another preferred aspect according to any one of the above-described aspects, the engine-side mounting surface extends in a rotation axis direction of the valve element. The first communicating aperture and the second communicating aperture are arranged away from each other in the rotation axis direction.

In still another preferred aspect according to any one of the above-described aspects, the valve element includes an opening whose overlapping degree with the first communicating aperture varies with the rotation angle of the valve element.

In a different view, the flow control valve according to a certain aspect is a flow control valve comprising a housing including a valve-element housing portion, a first communicating aperture configured to introduce cooling water, which has flown out of a first water channel formed in an engine, to the valve-element housing portion or discharge the cooling water in the valve-element housing portion to the second water channel formed in the engine, an internal passage connected to the valve-element housing portion through an internal communicating aperture, and a second communicating aperture which opens in the same plane as the first communicating aperture adjacently to the first communicating aperture, and discharges the cooling water in the internal passage to the second water channel or introduces the cooling water, which has flown out of the first water channel, to the internal passage; a valve element accommodated in the valve-element housing portion and configured to change a flow rate of the cooling water discharged to the second water channel, according to a rotation angle of the valve element; and an actuator configured to control the rotation angle of the valve element. The internal passage includes a connecting path extending from the internal communicating aperture to the outside of the housing, and a water conduit which connects the connecting path and the second communicating aperture to each other. The internal passage is provided with a cap which closes an opening of the connecting path.

Preferably, according to the above-described aspect, the cap includes inside a communicating path which connects the internal communicating aperture and the water conduit to each other.

In another preferred aspect according to any one of the above-described aspects, the communicating path is formed to connect the internal communicating aperture and the water conduit to each other in a continuous manner.

In still another preferred aspect according to any one of the above-described aspects, the flow control valve includes a rotary shaft which supports the valve element in such a way that the valve element is rotatable. The valve element is fixed to the rotary shaft and includes a support portion protruding toward an inner side of the valve element. The support portion has a tapered shape.

In still another preferred aspect according to any one of the above-described aspects, the housing includes a plurality of mounting bosses for mounting the housing on the engine side. The second communicating aperture opens in the mounting boss.

In still another preferred aspect according to any one of the above-described aspects, the cap is rotatable with respect to the housing around an axis thereof while closing the connecting path. The cap includes a fixing member which is capable of fixing the cap to the housing only when a position of the cap around the axis is a proper position.

In still another preferred aspect according to any one of the above-described aspects, the valve element has an opening which comes into communication with the internal communicating aperture when the valve element is positioned within a predetermined rotation angle range. The valve element includes a seal member configured to prevent the cooling water from leaking from the opening or the internal communicating aperture into a gap between the valve-element housing portion and the valve element. The seal member is biased toward the valve element by the cap.

In a still different view, the flow control valve according to a certain aspect is a flow control valve comprising a housing including a valve-element housing portion, a first communicating aperture configured to introduce cooling water, which has flown out of a first water channel formed in an engine, to the valve-element housing portion or discharge the cooling water in the valve-element housing portion to a second water channel formed in the engine, an internal passage connected to the valve-element housing portion through an internal communicating aperture, and a second communicating aperture configured to discharge the cooling water in the internal passage to the second water channel or introduce the cooling water, which has flown out of the first water channel, to the internal passage; a valve element accommodated in the valve-element housing portion and including an opening whose overlapping degree with the internal communicating aperture varies with a rotation angle of the valve element; and an actuator configured to control the rotation angle of the valve element. The housing includes a mounting portion extending in a direction intersecting with a rotation axis of the valve element and including an engine-side mounting surface in which the first communicating aperture and the second communicating aperture open, and a reinforcing rib extending in a direction of the rotation axis and provided inside with the internal passage.

Preferably, according to the above-described aspect, the housing includes a mounting boss for mounting the housing on the engine side. The mounting boss extends from the mounting portion in a radial direction of the rotation axis. The reinforcing rib is connected to the mounting boss.

In another preferred aspect according to any one of the above-described aspects, the housing includes an actuator housing portion for accommodating the actuator. The reinforcing rib is connected to an outer wall of the actuator housing portion.

In still another preferred aspect according to any one of the above-described aspects, the housing includes a radiator water conduit which is connected to a radiator. The radiator water conduit is formed in a different surface from the engine-side mounting surface.

The present application claims priority from the Japanese Patent Application No. 2017-088788 filed on Apr. 27, 2017. The entire disclosure including Specification, Scope of Claims, Drawings, and Abstract of Japanese Patent Application No. 2017-088788 filed on Apr. 27, 2017 is incorporated herein in its entirety by reference.

REFERENCE SIGNS LIST 1, 1A, 1B Cooling system
2 Engine
2a, 2e First water channel
2b, 2f Second water channel
8, 67 MCV (flow control valve)
10, 68 Housing
11, 69 Drive mechanism (actuator)
12, 70 Rotor (valve element)
16 Mounting portion
16a, 74 Engine-side mounting surface
16b Mounting boss
27 Motor housing portion (actuator housing portion)
27a Outer wall
28 Reinforcing rib
38 Second opening (opening)
44, 97 Valve-element housing portion
45, 98 Water conduit
46, 99 First communicating aperture
47, 100 Second communicating aperture
48, 101 Connecting path
48a, 101a Opening
50, 102 Internal communicating aperture
51, 103 Cap
52d, 104c Communicating path
57, 106 Internal passage
95 First opening (opening)

What is claimed is:

1. A flow control valve comprising:
a housing including a valve-element housing portion, a first communicating aperture configured to introduce cooling water flowing out of a first water channel formed in an engine side to the valve-element housing portion, or discharge the cooling water in the valve-element housing portion to a second water channel formed in the engine side, and a second communicating aperture configured to discharge the cooling water in the valve-element housing portion to the second water channel or introduce the cooling water flowing out of the first water channel to the valve-element housing portion;
a valve element accommodated in the valve-element housing portion and structured to change a flow rate of the cooling water discharged to the second water channel, according to a rotation angle of the valve element; and
an actuator configured to control the rotation angle of the valve element, wherein
the first communicating aperture and the second communicating aperture open in an engine-side mounting surface of the housing,
the housing includes an internal passage in communication with the second communicating aperture, and an internal communicating aperture which connects the internal passage and the valve-element housing portion to each other;
the internal passage includes a connecting path extending from the internal communicating aperture to the outside of the housing, and a water conduit which connects the connecting path and the second communicating aperture; and
the flow control valve is provided with a cap which closes the connecting path, the cap including inside a communicating path which connects the internal communicating aperture and the water conduit to each other.

2. The flow control valve according to claim 1, comprising:
annular seal members which encircle the first communicating aperture and the second communicating aperture, wherein the housing includes a plurality of mounting bosses for mounting the housing on the engine side, the plurality of mounting bosses being arranged around an inlet aperture, wherein one of the first and second communicating aperture is the inlet aperture, which introduces the cooling water.

3. The flow control valve according to claim 1, wherein the engine-side mounting surface extends in a direction intersecting with a rotation axis of the valve element; and
the first communicating aperture and the second communicating aperture are disposed to open in a direction of the rotation axis.

4. The flow control valve according to claim 3, wherein the housing includes an internal passage in communication with the second communicating aperture, and an internal communicating aperture which connects the internal passage and the valve-element housing portion to each other;
the valve element includes an opening, and
an overlapping degree of the opening with the internal communicating aperture varies with a rotation angle of the valve element.

5. The flow control valve according to claim 1, wherein the engine-side mounting surface extends in a direction of a rotation axis of the valve element; and
the first communicating aperture and the second communicating aperture are arranged away from each other in the direction of the rotation axis.

6. The flow control valve according to claim 5, wherein the valve element includes an opening, and
the overlapping degree of the opening with the first communicating aperture varies with the rotation angle.

7. The flow control valve according to claim 1, wherein the housing includes an internal passage in communication with the second communicating aperture, and an internal communicating aperture which connects the internal passage and the valve-element housing portion to each other;
the valve element includes an opening, and
an overlapping degree of the opening with the first communicating aperture or the internal communicating aperture varies with the rotation angle of the valve element.

8. The flow control valve according to claim 7, wherein one of the first and second communicating aperture is an inlet aperture, which introduces the cooling water, and the inlet aperture is larger in sectional area than the internal communicating aperture.

9. A flow control valve comprising:
a housing including a valve-element housing portion, a first communicating aperture configured to introduce cooling water flowing out of a first water channel formed in an engine side to the valve-element housing portion, or discharge the cooling water in the valve-element housing portion to a second water channel formed in the engine side, an internal passage connected to the valve-element housing portion through an internal communicating aperture, and a second communicating aperture which opens in a same plane as the first communicating aperture adjacently to the first communicating aperture, the second communicating aperture being configured to discharge the cooling water in the internal passage to the second water channel or introduce the cooling water flowing out of the first water channel to the internal passage;
a valve element accommodated in the valve-element housing portion and configured to change a flow rate of the cooling water discharged to the second water channel, according to a rotation angle of the valve element; and
an actuator configured to control the rotation angle of the valve element, wherein
the internal passage includes a connecting path extending from the internal communicating aperture to the outside of the housing, and a water conduit which connects the connecting path and the second communicating aperture to each other; and
the flow control valve is provided with a cap which closes an opening of the connecting path.

10. The flow control valve according to claim 9, wherein the housing includes a plurality of mounting bosses for mounting the housing on the engine side; and
the second communicating aperture opens in at least one of the mounting bosses.

11. The flow control valve according to claim 9, further comprising:
a rotary shaft which rotatably supports the valve element, wherein
the valve element is fixed to the rotary shaft and includes a support portion protruding toward an inner side of the valve element; and
the support portion has a tapered shape.

12. The flow control valve according to claim 9, wherein the cap is rotatable with respect to the housing around an axis thereof with the connecting path being closed, and includes a fixing member configured to fix the cap to the housing only when a position of the cap around the axis is a predetermined position.

13. The flow control valve according to claim 9, wherein the valve element includes an opening disposed to come into communication with the internal communicating aperture when the valve element is positioned within a predetermined rotation angle range;
the valve element includes a seal member disposed to prevent which prevents the cooling water from leaking from the opening or the internal communicating aperture into a gap between the valve-element housing portion and the valve element; and
the seal member is biased toward the valve element by the cap.

14. The flow control valve according to claim 9, wherein the cap includes inside a communicating path which connects the internal communicating aperture and the water conduit to each other.

15. The flow control valve according to claim 14, wherein the communicating path is formed to connect the internal communicating aperture and the water conduit to each other in a continuous manner.

16. A flow control valve comprising:
a housing including a valve-element housing portion, a first communicating aperture configured to introduce cooling water flowing out of a first water channel formed in an engine side to the valve-element housing portion, or discharge the cooling water in the valve-element housing portion to a second water channel formed in the engine side, an internal passage connected to the valve-element housing portion through an internal communicating aperture, and a second communicating aperture configured to discharge the cooling water in the internal passage to the second water channel or introduce the cooling water flowing out of the first water channel to the internal passage;
a valve element accommodated in the valve-element housing portion and including an opening, an overlapping degree of the opening with the internal communicating aperture varying with a rotation angle of the valve element; and
an actuator configured to control the rotation angle of the valve element, wherein
the housing includes:
a mounting portion extending in a direction intersecting with a rotation axis of the valve element and including an engine-side mounting surface in which the first communicating aperture and the second communicating aperture open;
a reinforcing rib extending in a direction of the rotation axis and being a wall that forms a water conduit partly defining the internal passage; and
a mounting boss for mounting the housing on the engine side,
wherein the reinforcing rib is connected to the mounting boss.

17. The flow control valve according to claim 16, wherein the mounting boss extends from the mounting portion in a radial direction of the rotation axis.

18. The flow control valve according to claim 16, wherein the housing includes an actuator housing portion for accommodating the actuator; and
the reinforcing rib is connected to an outer wall of the actuator housing portion.

19. The flow control valve according to claim 16, wherein the housing includes a radiator water conduit which is connected to a radiator; and the radiator water conduit is formed in a different surface from the engine-side mounting surface.

* * * * *

UNITED STATES PATENT AND TRADEMARK OFFICE
CERTIFICATE OF CORRECTION

PATENT NO. : 10,808,856 B2
APPLICATION NO. : 15/954807
DATED : October 20, 2020
INVENTOR(S) : Zhenyu Shen, Shingo Murakami and Hideaki Nakamura It is certified that error appears in the above-identified patent and that said Letters Patent is hereby corrected as shown below:

On the Title Page

Item (72) Inventors, the name of the second inventor should read as follows:
Shingo Murakami

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*